(12) United States Patent
Wood

(10) Patent No.: US 12,276,758 B1
(45) Date of Patent: *Apr. 15, 2025

(54) MULTI-BEAM LASER SCANNER WITH PROGRAMMABLE FIELD OF VIEW

(71) Applicant: Insight LiDAR, Inc., Lafayette, CO (US)

(72) Inventor: Christopher Wood, Lafayette, CO (US)

(73) Assignee: Insight LiDAR, Inc., Lafayette, CO (US)

(*) Notice: Subject to any disclaimer, the term of this patent is extended or adjusted under 35 U.S.C. 154(b) by 1090 days.

This patent is subject to a terminal disclaimer.

(21) Appl. No.: 17/181,016

(22) Filed: Feb. 22, 2021

Related U.S. Application Data

(60) Provisional application No. 62/990,505, filed on Mar. 17, 2020.

(51) Int. Cl.
*G01C 3/08* (2006.01)
*G01S 7/48* (2006.01)
*G01S 7/481* (2006.01)
*G01S 17/89* (2020.01)
*G01S 17/931* (2020.01)

(52) U.S. Cl.
CPC .......... *G01S 7/4817* (2013.01); *G01S 7/4808* (2013.01); *G01S 17/89* (2013.01); *G01S 17/931* (2020.01)

(58) Field of Classification Search
CPC ...... G01S 7/4817; G01S 7/4808; G01S 17/89; G01S 17/931
See application file for complete search history.

(56) References Cited

U.S. PATENT DOCUMENTS

| | | | |
|---|---|---|---|
| 11,162,789 B2 * | 11/2021 | Lodin | G01J 3/00 |
| 11,493,753 B1 * | 11/2022 | Wood | G02B 27/10 |
| 2020/0081101 A1 * | 3/2020 | Donovan | G01S 7/4815 |
| 2020/0166647 A1 * | 5/2020 | Crouch | G01S 17/26 |

* cited by examiner

*Primary Examiner* — Mark Hellner
(74) *Attorney, Agent, or Firm* — Renner, Otto, Boisselle & Sklar, LLP

(57) ABSTRACT

An optical system and a method for non-mechanically (i.e., without physical movement) scanning a laser using a lens, a steering optical element, and an array of transmission paths configured to simultaneously emit a same wavelength of electromagnetic radiation.

51 Claims, 22 Drawing Sheets

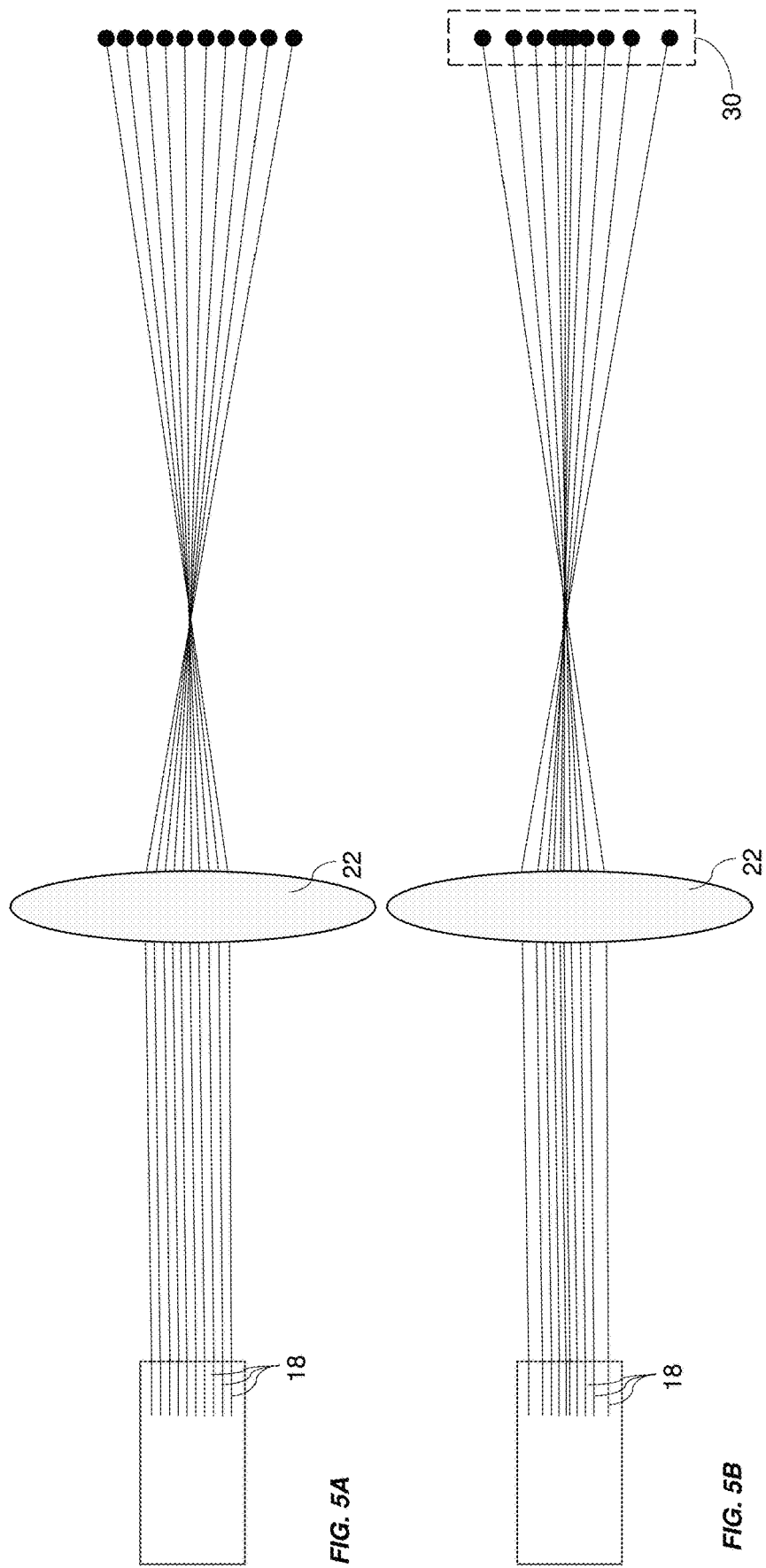

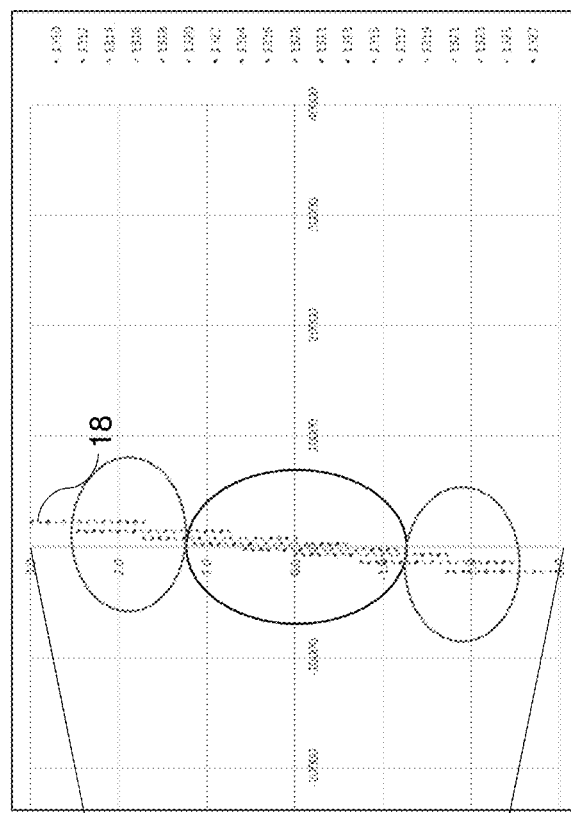
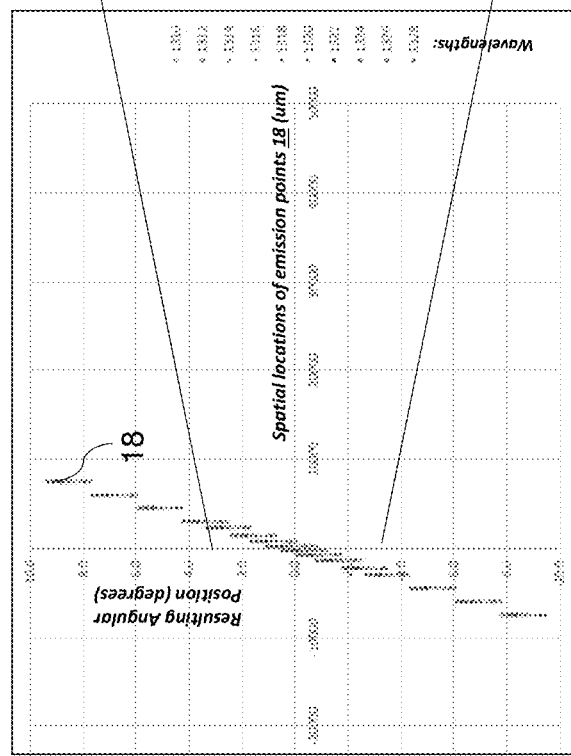
FIG. 10A
FIG. 10B

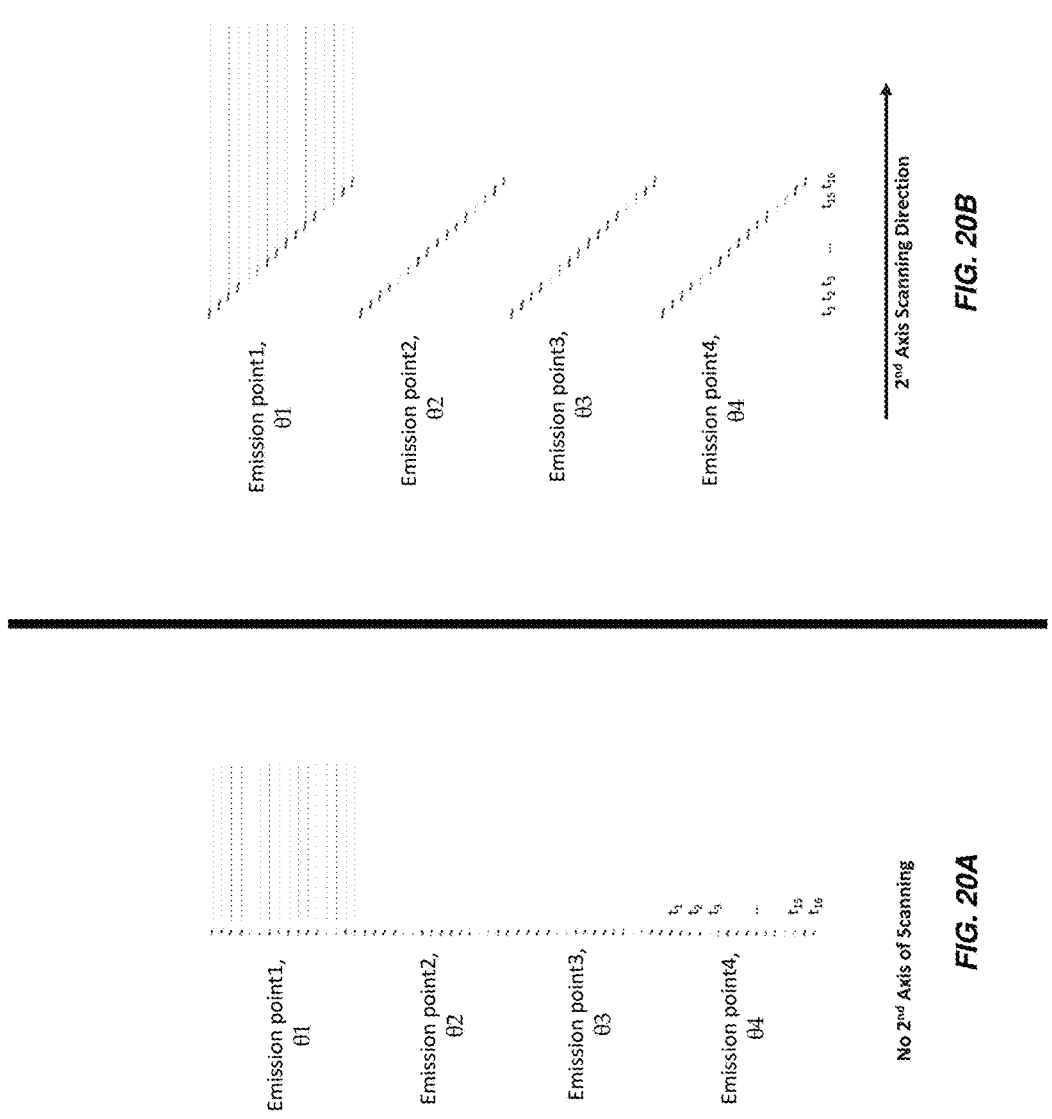

MULTI-BEAM LASER SCANNER WITH PROGRAMMABLE FIELD OF VIEW

TECHNICAL FIELD

The present invention relates generally to a system and a method for scanning multiple laser beams through a pattern of spatial and angular positions, using a combination of optical beams, optically dispersive elements, and optical switches. These scanning techniques, when combined with a similar and corresponding detection scheme, can be used for any laser-based approach to imaging ("active imaging") or sensing, such as Light Detection and Ranging (LiDAR), Laser Detection and Ranging (LaDAR), spectroscopy, remote sensing, interferometry, free space laser communications, surveillance, and mapping, among many others.

BACKGROUND

Since the earliest days of laser technology, there has been a need to move a laser beam over a pattern of spatial and/or angular positions ("laser scanning"), and the various methods in use today are too numerous to detail. However, recent higher speed active imaging applications have highlighted a specific weakness in all these established (typically short-range) techniques, particularly when combined with significant imaging or sensing distances. In that scenario, and because of the finite round trip transit time to an imaged target due to the speed of light, a single scanning laser beam is often not able to meet the imaging speed requirements. Further, these emerging applications often require that the imaging resolution or Field of View (FOV), or both, must be adjusted in a programmable manner in real- or near-real time. It is preferred that this programmability be accomplished without the use of any moving parts.

SUMMARY

As an example, if each spot or pixel in an image requires 2 microseconds (μs) for a measurement, and an image of 1250×400 pixels is desired, then this system would take 1 second to create a single image. If the application requires an image rate of 30 images per second (30 Hz rate), then this is 30× too slow. In this example, if the scanning technique was able to appropriately accommodate 30 simultaneous beams, rather than a single scanning beam, then the requirements may still be met. Ideally, such a parallel beam laser scanner would also minimize or eliminate any moving parts or moving mechanisms and could operate at very high speed.

There is a need for an approach to high-speed laser scanning that incorporates multiple simultaneous laser beams utilizing non-mechanical means for various angular adjustments of the beams. Such a system is capable of solving the above challenge for high speed imaging as well as the requirement for long range imaging (with significant time delay due to the speed of light). For active imaging systems with ranges or distances on the order of 200 meters, the round-trip transit time delay due to the speed of light is 1.3 microseconds. This places a severe burden on the system, as each pixel in the image must now accommodate this amount of time before it begins to receive the return (reflected) signal from a target illuminated by the laser beam. A solution to this problem is the use of multiple laser beams, all scanning simultaneously, in order to effectively overcome this time delay problem and reach higher imaging speeds.

There is a further need for high-speed laser scanning to accommodate the concept of foveation. This relates to the aspect of a human eye (the fovea) that contains a higher density of rods and cones in the central region, resulting in the highest human resolution in that region. Other regions of the eye's field of view (FOV) do not have the same high resolution. When an imaging system mimics this functionality, with a higher pixel density (higher resolution) in some region of an image, it is called foveation. It is desirable for this foveation to be programmable and adaptive within the imaging system, further mimicking the human eye.

The prototypical method of laser scanning is shown in FIG. 1, where the motion of the laser beam 202 is created by one or more mirrors 204 with rotating mechanical axes. The angle of the outgoing beam from such an arrangement depends on the rotation angle(s) of the mirror(s) 204 as well as the angle of the incident beam. Those skilled in the art are familiar with this configuration, as well as its numerous embodiments and variations that can be described as having a 'rotating mechanical axis'.

Alternatively, FIG. 2 shows one well-known method of laser scanning using non-mechanical means. In this case, an optically dispersive element 206 is used in conjunction with a laser whose emission wavelength is tunable. The angle of the outgoing beam 208 from such an arrangement now depends on the laser's wavelength, and on the dispersive property of the element such as the index of refraction. Assuming that changing the laser's wavelength is faster than changing the dispersion of the element (such as through heating), it is desirable to imagine a beam steering mechanism that uses the fast wavelength tuning of the laser. Assuming that wavelength can be changed via non-mechanical means—in either discrete or continuous fashion—then this method of laser scanning can be categorized as 'non-mechanical'. The limiting technical constraint with the configuration of FIG. 2 is a limited amount of angular coverage due to a limited amount of wavelength tuning for the laser, given a typical value of optical dispersion. For instance, only 8 degrees of angular tuning is typically achievable using a typical diffraction grating (dispersion ~0.08 deg/nm) and an extremely wide-tuning laser having bandwidth of 100 nm. One skilled in the art will recognize that such arguments also apply to an optical phased array, as an example of a programmable dispersive element.

FIG. 3 shows a method for achieving another sort of non-mechanical steering for laser beams using only passive optical elements. Here, a spatial array of emission points 212 is positioned near the focal plane of a lens 210, and the optical property of this lens converts these spatial offsets before the lens into angular offsets after the lens. The accessible output angles after the lens depend on the spatial positions of the emission points before the lens and the lens focal length, generally resulting in a set of non-continuous, discrete angular positions. This configuration has been made to function as a discrete-stepping laser scanner by causing one emission point, at a time, to be chosen in some time pattern or sequence through all points in the array, thereby causing the output angle for the laser beam to vary in time through a pattern or sequence. Such a discretized, one-beam-at-a-time scanner has been realized in both 1 scanning dimension and 2 scanning dimensions.

FIG. 3 also shows the inclusion of mechanical scanning means, so that truly continuous tuning may be achieved, including between the discrete angular positions. However, if such mechanical scanning means are now included, then it can be argued that the discrete angular positions created by the spatial offsets before the lens are now largely unnecessary. The principal advantage enabled by FIG. 3 is the reduction in the total amount of angular scanning required of that mechanical scanning means—it now only has to move 'between the emission points', rather than over the entire FOV. Moderately improved scanning can be achieved in this scheme, but at the expense of inserting mechanically moving parts. Hence there is a need for a high-speed laser scanner with substantial output angular coverage, utilizing non-mechanical means, and enabling the use of multiple simultaneous scanning beams.

FIG. 4 shows a configuration that combines the angular scanning means of FIG. 2 and FIG. 3 using a high-speed tunable laser 214 in conjunction with the spatial array of emission points 212, a lens 210, and an optically dispersive element 216. The spatial array of emission points coupled with the lens serves to provide a discrete set of output angles covering a wide angular range ("coarse scan") (e.g., few degrees to tens of degrees), while the tunable laser and dispersive element provide means for a narrow range of angular adjustment ("fine scan"). Here, each emission point has a common wavelength, so the wavelength tuning for the fine scan serves to connect the angular space between each of the discrete angles of the coarse scan. This combination can therefore provide for a higher resolution angular scanning system, in one scanning dimension. Importantly, in prior work, this configuration has been limited in several ways. First, the system has been operated with only one beam at a time, largely for a simplified optical layout as well as simplified data acquisition. Second, the spatial array of emission points has been uniform, thereby providing for a uniformly-spaced angular scan pattern. Third, prior designs have taken care to avoid having any coarse scan angles and fine scan angles overlap with each other, viewing this as a complication, interference, or a degradation of the performance. Fourth, the static and uniform spatial array of emission points represented a fixed angular scan pattern that was neither adaptive nor foveated. Finally, when implemented as part of a coherent active imaging configuration, the use of optically non-reciprocal devices (such as circulators) has been required. The present invention encompasses means to overcome all of these prior limitations, enabling a high-speed, programmable, foveated, adaptive angular scanner with no moving parts.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 5A depicts an exemplary embodiment of the transmit/receive optical element including uniform spacing.

FIG. 5B depicts an exemplary embodiment of the transmit/receive optical element including non-uniform spacing.

FIGS. 10A and 10B depicts angular position for an exemplary arrangement of emission points for a range of wavelengths.

FIG. 20A shows an exemplary time sequence for a one dimensional scan.

FIG. 20B shows an exemplary fast axis angular scan pattern, with a second scanning dimension.

FIG. 20C shows an exemplary foveated angular scan pattern, with a second scanning dimension.

DETAILED DESCRIPTION

Figure 1:
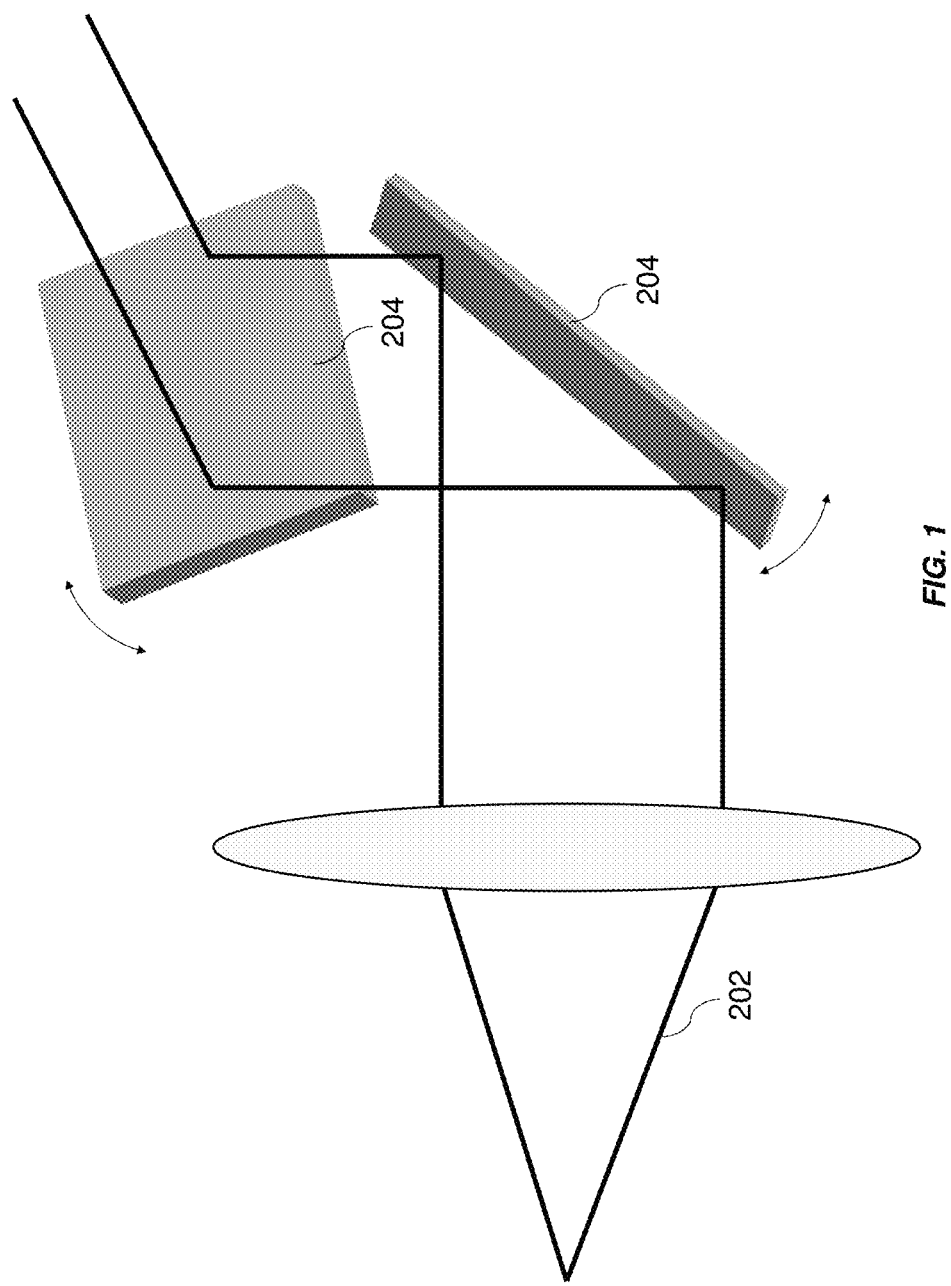
FIG. 1 is an exemplary embodiment of laser scanning known in the prior art having a first and second angular scanning means.
Figure 2:
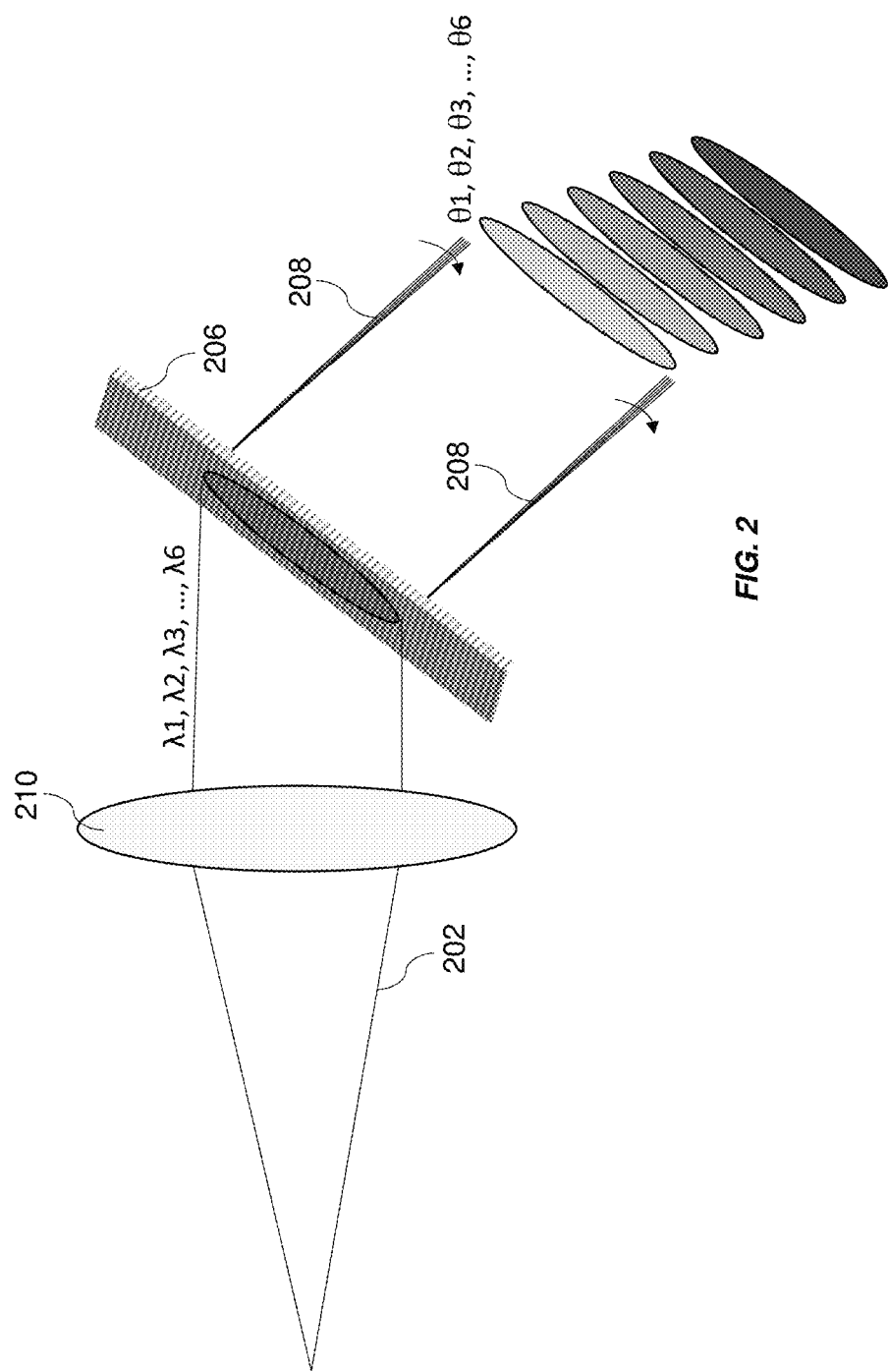
FIG. 2 is an exemplary embodiment of laser scanning known in the prior art using non-mechanical means.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It is desirous to implement a high-speed, programmable, foveated, adaptive angular scanner with no moving parts. It is desirous to implement such non-mechanical laser scanning over a wide angular range and incorporating high-speed wavelength tuning, while relaxing the usual constraint of extremely wide laser tuning bandwidths. It is further desirous to implement such scanning and imaging in a way that is readily miniaturized and/or whose design is partially or wholly translatable to a Photonic Integrated Circuit (PIC), without requiring the use of optically non-reciprocal components.

Figure 3:
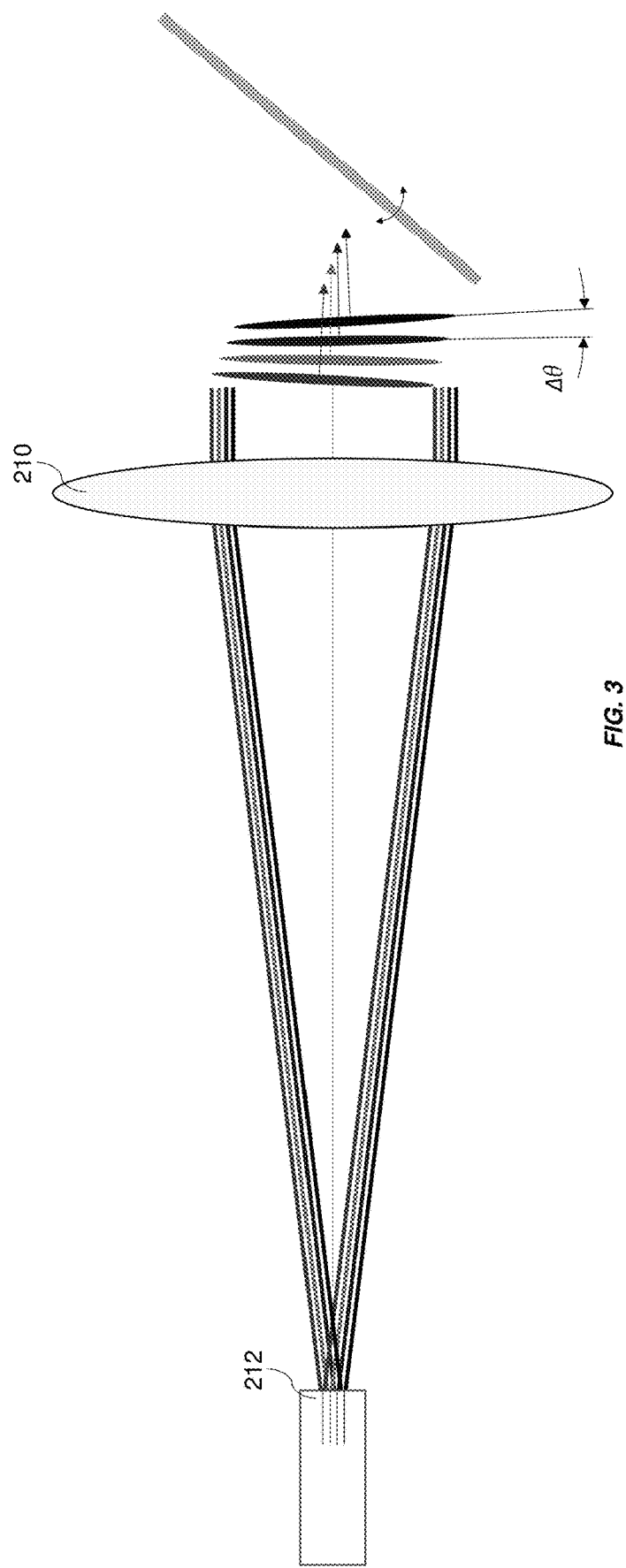
FIG. 3 is an exemplary embodiment of laser scanning using a lens and a mechanical scanning means.

FIG. 5B shows a configuration that enables a first aspect of foveation for the coarse angular scanning modality shown in FIG. 3. By moving from a uniformly-spaced set of emission points 18 as shown in FIG. 5A to a nonuniform set of emission points 18 as shown in FIG. 5B, the resulting coarse angular scanning pattern 30 has a foveated aspect to it-a higher density of accessible angles in the center of the angular scan compared to the outermost angles in the scan. The historical complication arising from such a scheme is the following: when superimposing a means of fine angular scanning on top of this foveated coarse angular scan pattern, overlapping or interfering angles will now result.

Figure 4:
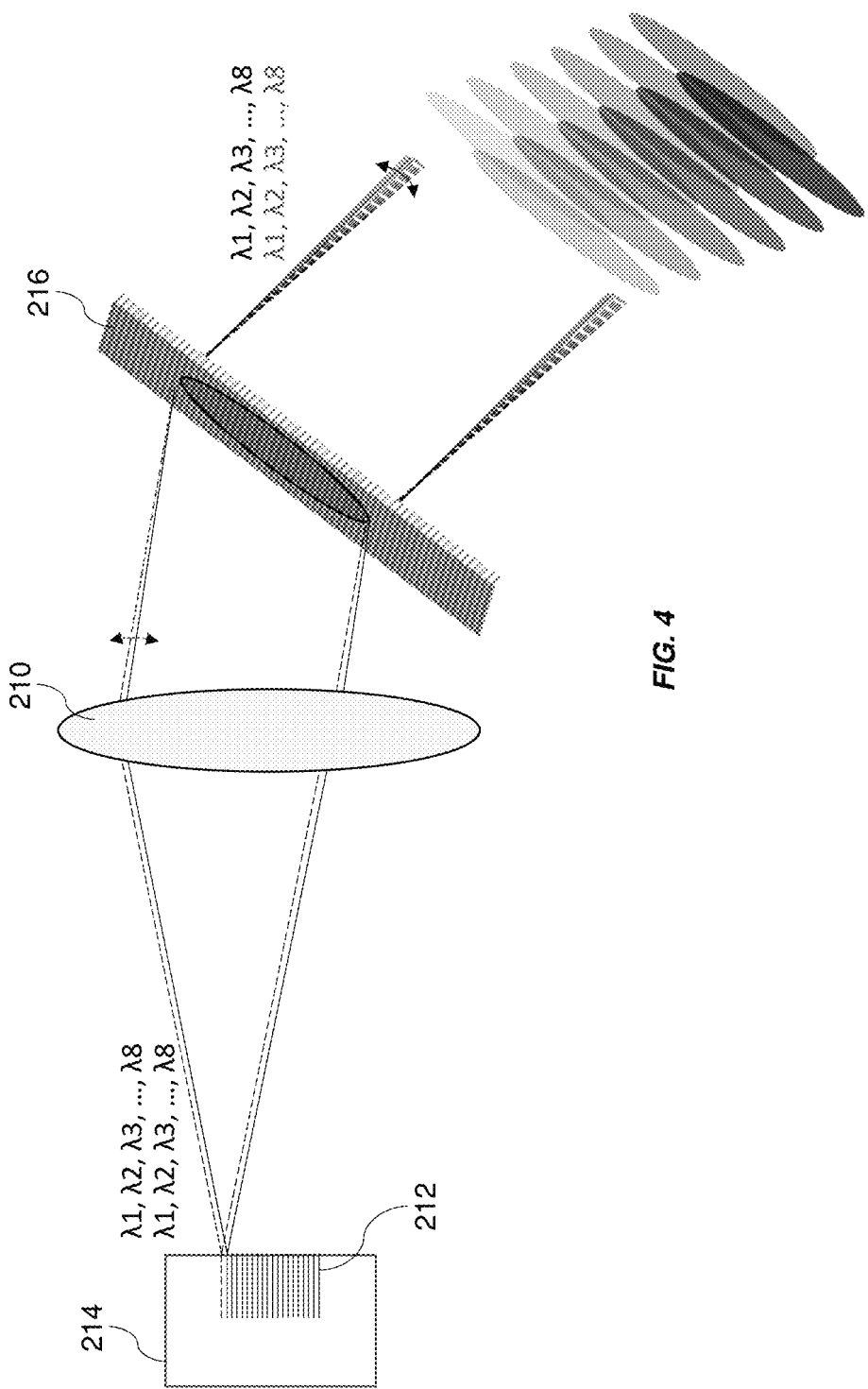
FIG. 4 is an exemplary embodiment of laser scanning using a lens and a non-mechanical scanning means.
Figure 7:
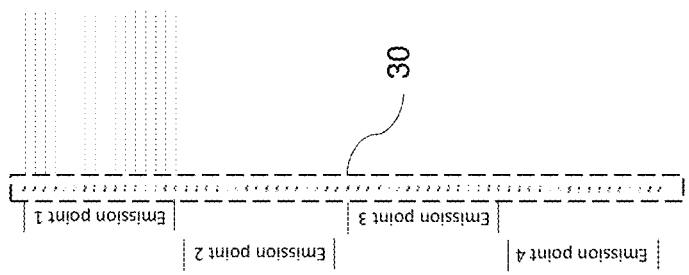
FIG. 7 depicts an exemplary relationship between wavelength and angular locations.
Figure 6:
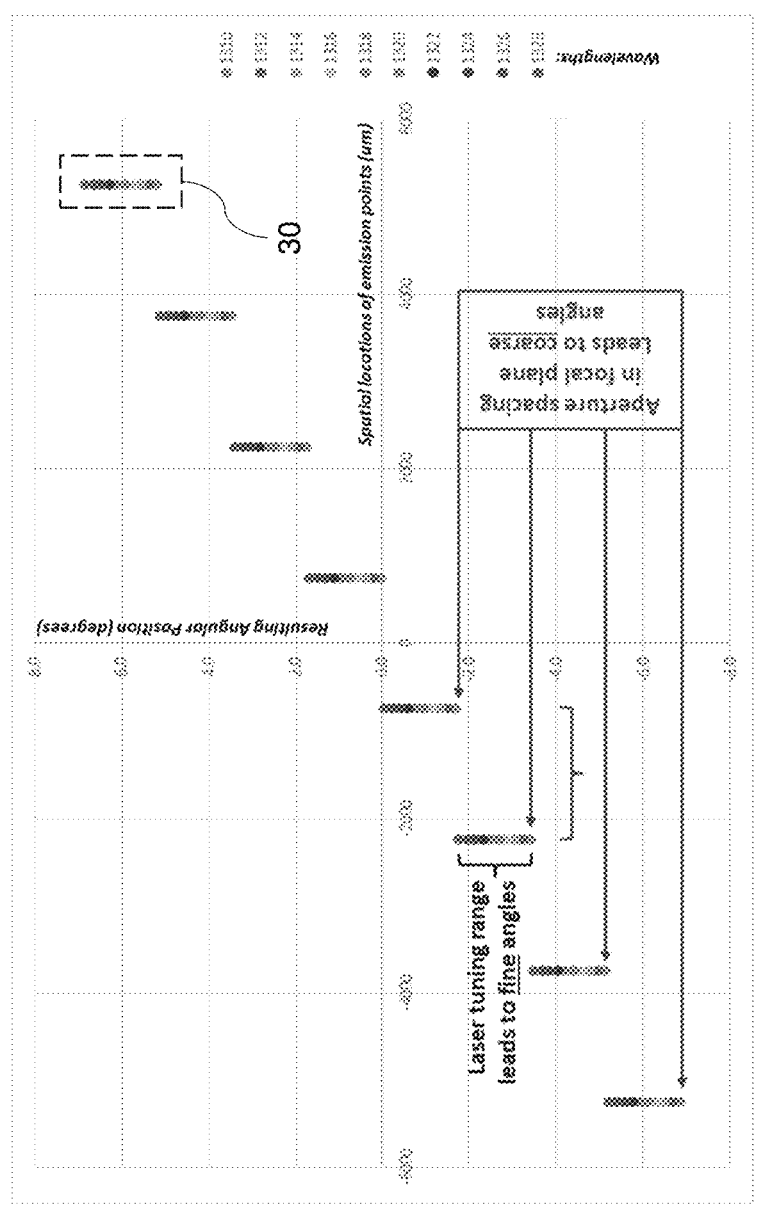
FIG. 6 depicts an exemplary relationship between wavelength, spatial location of emission points, and angular positions.

To better illustrate this point, take the configuration shown in FIG. 4 with a uniform spacing of emission points and wavelength tuning as the means for the fine angular scanning. In this case, the angular range for fine tuning may be adjusted so that it nearly, or exactly, connects the angular space between adjacent points associated with the coarse angular scan. The resulting (coarse+fine) angular scan pattern is shown in FIG. 6, and demonstrates a uniformly spaced pattern. This graph shows the spatial locations for the emission points (also referred to as transmit paths) 18 along the x-axis and the angular positions along the y-axis, and is used to clearly specify the details for each angular position. Each point in this graph represents a unique (emission point=$P_i$, wavelength=$\lambda_j$) parameter pair spanning i emission points 18 and j wavelengths. In real space, if the spatial array of emission points 18 is linear and oriented along the same dimension as the optically dispersive direction, then the resulting angular scan pattern is one dimensional, and can be visualized by compressing the x-axis so that all resulting angular positions lie along the y-axis. This results in a uniformly spaced, one-dimensional pattern of angular positions that have minimal gaps in angle and no overlapping or interfering angles, as partially represented in FIG. 7. The coarse and fine angular scanning modalities can be treated independently and angular conflicts are avoided, especially when using only one emission point at a time.

Figure 8:
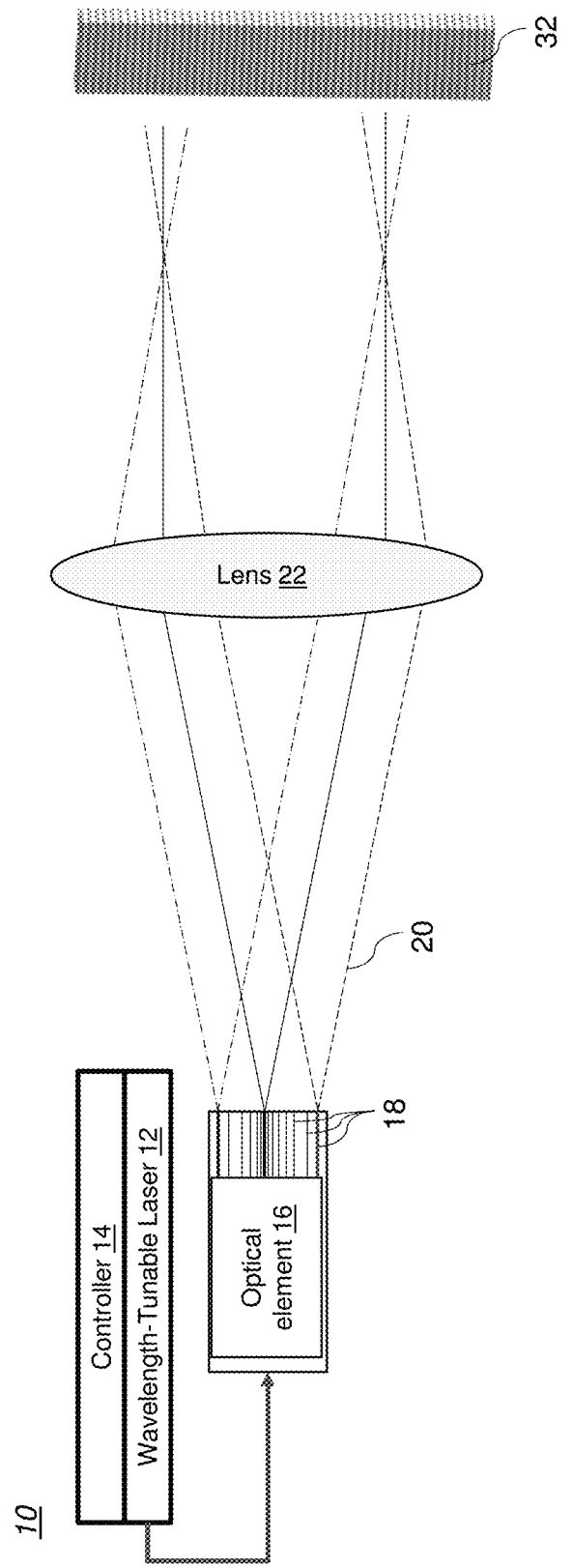
FIG. 8 depicts an optical system including a light source, optical switching system, lens, and optically dispersive element.

The above example, while relatively simple, is quite restrictive and very much not a comprehensive solution to the larger configuration space of any coarse+fine angular scanning geometry. First, angular overlap or conflict between final angles associated with different ($P_i$, $\lambda_j$) pairs can be accomplished in a manner that is neither restrictive nor interfering. Second, the spatial array of emission points 18 can be made nonuniform, and adaptive via an optical element 16 (also referred to as an optical switching means), to substantial benefit. Third, the system can be operated at much higher speeds and data rates via simultaneous operation of multiple emission points 18. This more general architecture is shown in FIG. 8 and represents an optical scanning architecture with substantially novel features including an optically dispersive element 32.

Figure 9:
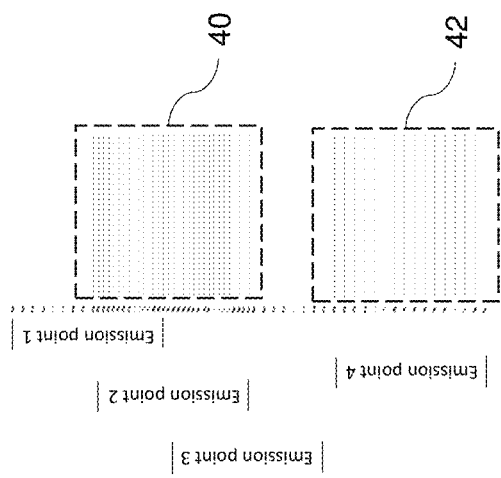
FIG. 9 shows interleaved angular locations due to overlap between adjacent emission points.

The above notion of a 'coarse+fine' scanning modality can be further generalized to achieve even finer angular resolution if the restriction of non-overlapping final scanning angles is removed. With appropriate design, the resulting final angles from different ($P_i$, $\lambda_j$) sets can be made to interleave 40, resulting in controllable, higher resolution compared to the above example. The general principle for this is visualized in FIG. 9, where i=4 emission apertures are used with j=16 uniformly-spaced wavelengths. For this example, the resulting sets of angles from emission points 1 and 2 are made to partially overlap when the range of angles (wavelengths) for the fine scan is made larger than the coarse angular spacing resulting from emission points 1 and 2. In this example, the same is done for emission points 2 and 3, while emission point 4 is spaced so that no other emission points 18 overlap. In the regions where the final set of angles from adjacent emission points 18 overlap, and if the spatial separation of emission points 18 and wavelength spacings are correct, then the resulting pattern of final angles 'interleaves' 40, and here achieves twice the angular resolution compared to the situation where overlap is strictly avoided 42. Here, interleaving 40 refers to the set of angular positions from emission point 1 ($P_1$, $\lambda_j$) at least partially overlapping with the set of angular positions from emission point 2 ($P_2$, $\lambda_j$). Such overlap can result in uniform but higher resolution (twice the resolution, in this example) by placing angular positions exactly halfway between each other. Or, more generally, the angular positions can result in arbitrary interleaving with respect to the overlapping angles.

FIGS. 10A and 10B demonstrate this concept with a realistic example having i=16 simultaneous emission points 18, nonuniform spacing of emission points, optical dispersion of 0.08 deg/nm, central wavelength of 1320 nm, j=20 wavelengths, and a uniform wavelength step for the fine angular positioning of 1.0 nm. The resulting angular scanning pattern shown in FIGS. 10A and 10B has a 19 deg total angular FOV, along with a central foveated region of ~7 deg. The central 2.4 deg angular region has an effective angular resolution of 0.027 deg, compared to the 0.08 deg that would result if no overlapping or interleaving was allowed. For the immediate 1.3 deg beyond this central foveated region, the resulting resolution is 0.04 deg, still 2× better than without interleaving. Due to the use of 16 simultaneous emission points along with the ability of tunable lasers to rapidly change their wavelength, this example highlights how this unique and novel optical configuration provides a means for satisfying the emerging requirements of foveated, high-speed optical scanning systems with no moving parts.

In FIG. 10A, only ten wavelengths are shown for clarity (e.g., every other wavelength is shown). In FIG. 10B, all twenty wavelengths are shown.

In the example for FIGS. 10A and 10B, the spatial array of emission points 18 represents a fixed angular scan pattern that was carefully foveated, but not yet adaptive. An adaptive scanning pattern in this context once again involves no moving parts, yet enables features such as a steerable FOV in addition to foveation and high resolution. This is desirable for example in an automotive LiDAR situation, where it is necessary to maintain the foveated central portion of the overall angular scan pattern on the horizon, even as the car goes over hills, or otherwise encounters an undulation in the road. The horizon is considered the most important zone for an automotive LiDAR, where most of the critical information is obtained, and is therefore always the region of highest interest.

Such a steerable FOV can be accomplished by altering the spatial array of emission points 18 so that different regions, patterns, or subsets of emission points 18 are chosen from a larger total available set of emission points 18. It may seem easier to simply allow all the emission points 18 to operate simultaneously, and while this is a clear design possibility here it can lead to several issues. First, the resulting optical power may exceed human eye safety requirements, especially when the required optical power is higher such as with longer range LiDAR imaging. While high power could still be maintained for some emission points 18, at the expense of others, this could still cause a trade-off in eye safety versus imaging distance.

Second, operating with optical signals for every emission point in a large set leads to increased complexity, parts count, thermal load, and electrical load. This is undesirable for many of the most important and high-volume applications of this technology. A better approach is to use subsets of the available emission points 18 in the spatial array, which offers advantages in eye safety, complexity, and power draw while also enabling a steerable FOV. This use of subsets from the spatial array forms a novel means of angular scanning within the framework of the optical architectures shown in FIG. 8. Subsets are chosen using optical switching systems, which may use the thermo-optic effect, electro-optic effect, piezoelectric effect, micro-electro-mechanical structures, or any other optical switching means that has sufficient speed and high reliability. While the goal in the following descriptions is to achieve such switching using non-mechanical means, this is not a fundamental limitation.

Figure 11:
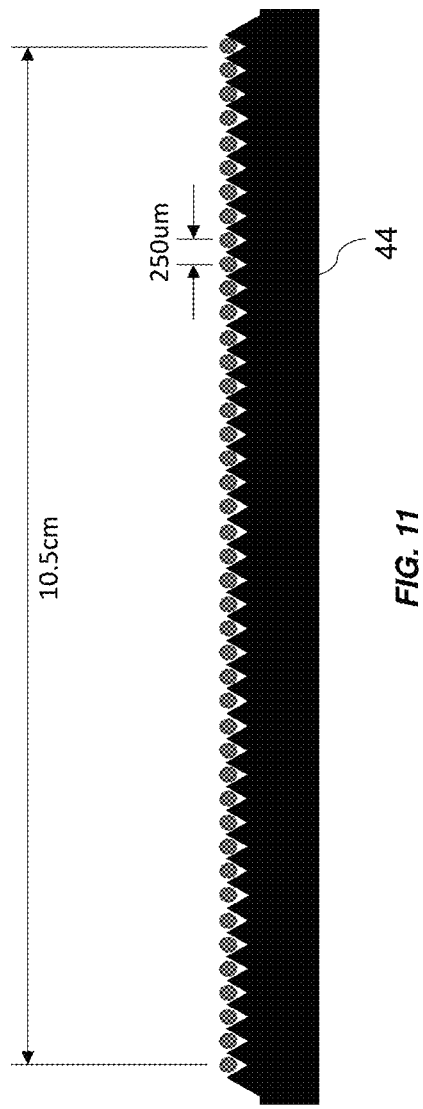
FIG. 11 shows an exemplary embodiment of a spatial array of emission points.
Figure 12A:
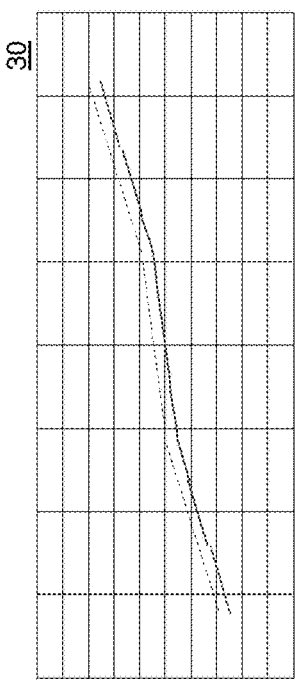
FIGS. 12A, 12C, and 12E depict selecting different patterns of active emission points.
Figure 12B:
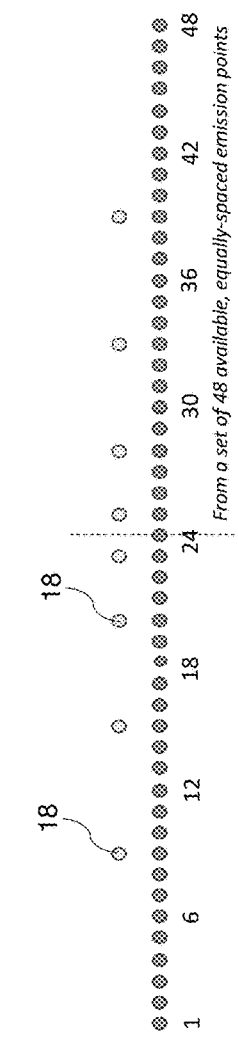
FIGS. 12B, 12D, and 12F depict exemplary graphs showing change in angle due to different active emission patterns in FIGS. 12A, 12C, and 12E respectively.

FIG. 11 shows how a commercially-available fiber v-groove array 44 may be used as the spatial array of emission points 18, here providing 48 possible uniformly-spaced (250 microns) choices for the emission point positions. FIGS. 12A-12F shows how proper selection of subsets within this structure leads to a foveated and steerable FOV. FIG. 12A shows a selection of eight emission points 18 from the larger available set of 48, and choosing a nonuniform spatial pattern that leads to coarse foveation. FIG. 12B shows the resulting angular scan pattern 30, properly accounting for all effects from overlapping/interleaved fine angular scanning using a tunable laser and dispersive element as described above. Here, the three different dashed slopes shown in FIG. 12B represent three different net angular resolutions: for the outermost angles the resulting resolution is 0.08 deg (0.08 deg between adjacent angular positions) while for the foveated innermost angles the resulting resolution is 0.04 deg.

Figure 12C:
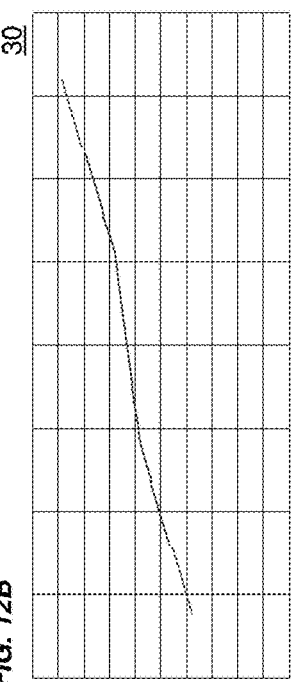
Figure 12D:
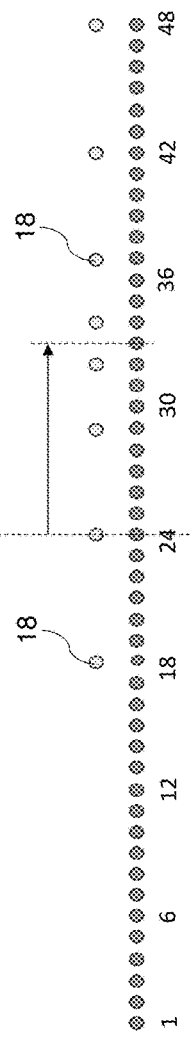
Figure 12E:
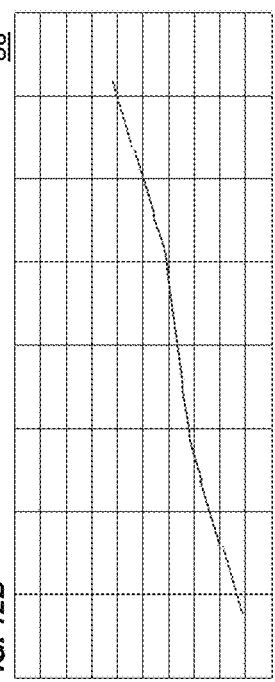
Figure 12F:
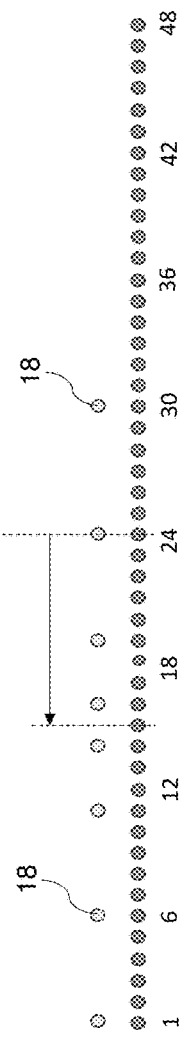
Figure 13A:
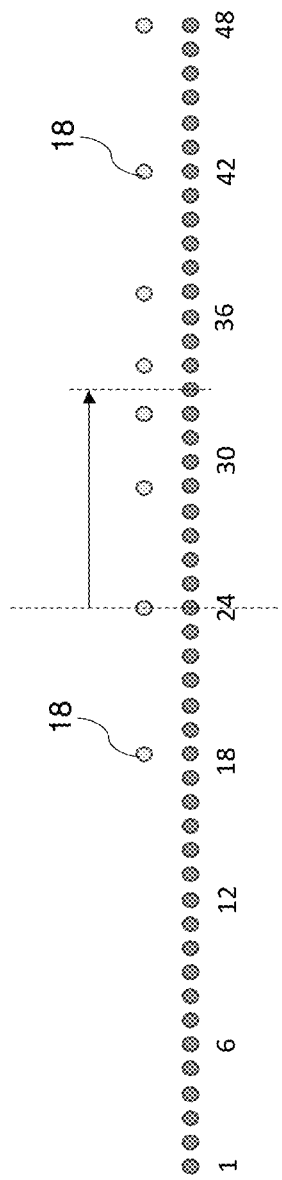
FIG. 13A depicts shifting the pattern of active emission points while altering a central wavelength of the emitted electromagnetic radiation.
Figure 13B:
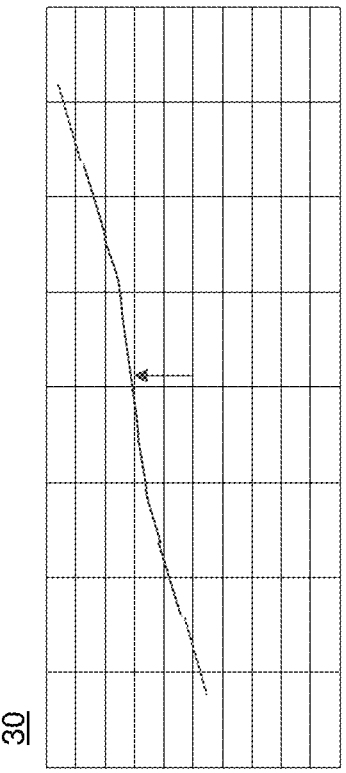
FIG. 13B depicts the corresponding change in angle caused by the change in FIG. 13A.

FIG. 12C shows the resulting situation when the eight emission point pattern of FIG. 12A is effectively shifted 9 positions to the right in the fiber v-groove array (by means of optical switching system, for instance). Because these emission points 18 are in the focal plane of a lens, this net spatial shift of emission points 18 results in a net angular offset to the resulting angular scan, as shown in FIG. 12D. For a 50 mm focal length lens and the array of FIG. 11, the resulting angular shift is ~2.5 deg. The entire angular scan has shifted, so the FOV is steered by 2.5 deg. Similarly, FIGS. 12E and 12F show the same effect in the opposite direction, resulting in a net angular shift of 2.5 deg in the opposite direction, again steering the final, foveated FOV with the entire pattern shifted nine positions to the left. Finally, FIGS. 13A and 13B show the same situation as FIGS. 12C and 12D, except there is also a central wavelength shift from 1320 nm to 1300 nm, for the fine angular scanning (which encompasses+/−10 nm around this central value in this embodiment). This center wavelength shift creates yet another net shift in the resulting angular scan pattern, which may be combined with the shift due to the spatial offset in the emission point pattern. The result in this case is an additional 1.5 deg of angular shift, as shown in FIG. 13B.

The example configurations shown in FIGS. 12A-12F, 13A, and 13B show that by shifting a spatial pattern of emission points 18 within a larger set of available points, the resulting angular scanning pattern can be programmatically altered. In general, such a scheme may require an optical switching system for every emission point path. However, this category of spatial shifting operations can be made simpler and more efficient by judiciously choosing the spatial patterns so that the number of required optical switching operations is minimized. This serves to reduce the overall system complexity as well as the necessary electrical overhead. Further, as will be shown, by actually eliminating the need for optical switching system for many of the emission point paths, the optical losses for the system may be minimized and reliability improved, thereby improving the optical performance.

Figure 14A:
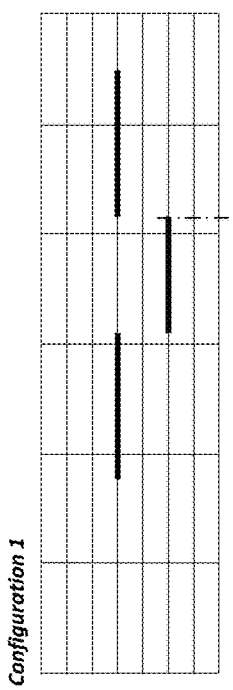
FIGS. 14A, 14C, and 14E depict shifting the pattern of active emission points while altering a central wavelength of the emitted electromagnetic radiation.
Figure 14C:
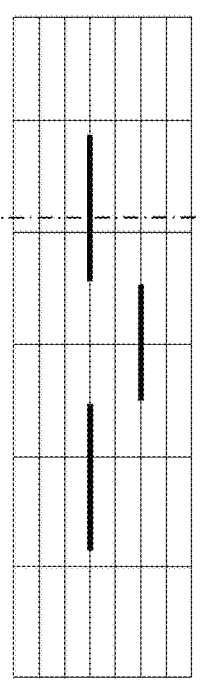
Figure 14E:
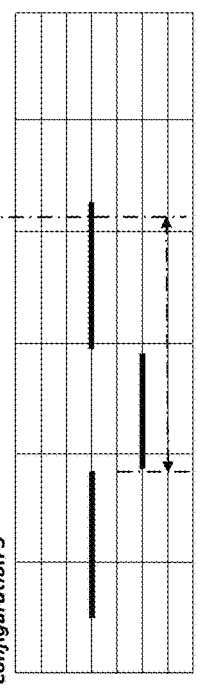
Figure 14B:
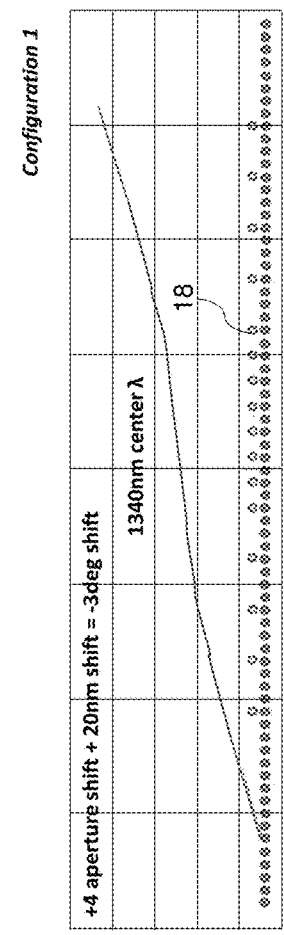
FIGS. 14B, D, and 14F depicts the corresponding change in resolution caused by the changes in FIGS. 14A, 14C, and 14E respectively.
Figure 14D:
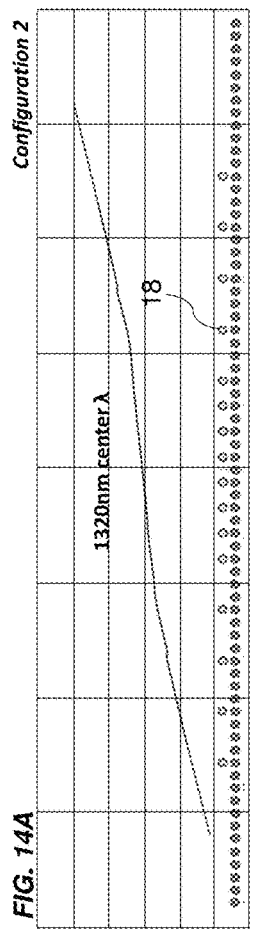
Figure 14F:
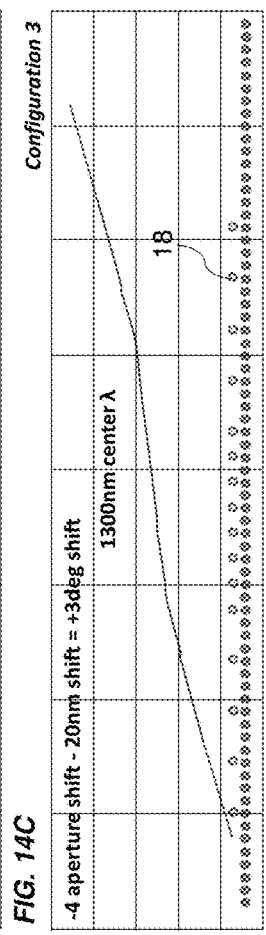

FIGS. 14A and 14B brings together the above concepts into a novel configuration with (1) 16 simultaneous emission points 18, (2) overlapping/interleaved coarse and fine scanning functions, (3) foveation, (4) programmatically steerable FOV via aperture shifting, (5) programmatically steerable FOV via coarse wavelength shifting, and (6) an optimized optical switching architecture. While this configuration combines all the above elements, it is clear that other configurations with only a subset of the above functions are also valid and novel. FIG. 14A is similar to FIG. 12, except that i=16 simultaneous emission points 18 are used here to create a foveated angular scan pattern, rather than i=8. FIG. 14 implements a 4-point shift, in each of two directions, along with a 20 nm shift in the central wavelength for the fine scanning, resulting in a FOV that is steerable by up to +/−3 deg. FIGS. 14A, 14C, and 14E shows the final absolute angles for the scanning pattern in each of the three configurations shown, properly accounting for the overlapping/interleaving of coarse and fine scanning. FIGS. 14B, 14D, and 14E is a slightly different view, showing the angular resolution, or the difference in angle between adjacent angular positions for the chosen configurations. This clearly shows that a net resolution of 0.04 deg is achieved in this architecture, with interleaved coarse and fine scanning, for the central foveated portion. It also shows the net 12 deg total range of coverage for this central foveated region, important for the above-mentioned example of horizon tracking, for instance.

Figure 15:
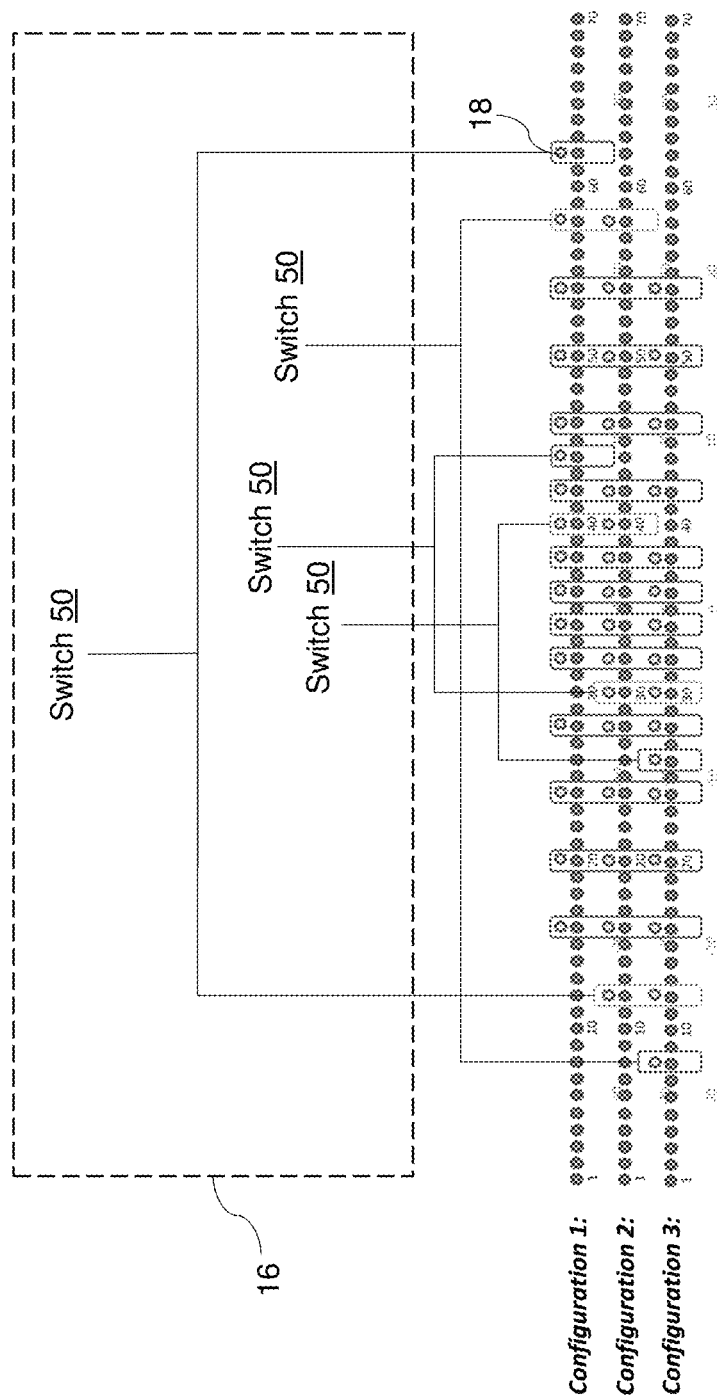
FIG. 15 depicts using multiple switches to alter which transmit paths are active to change between different configurations.

The choice of a 4-point shift in FIGS. 14A, 14C, and 14E, and 14B, 14D, and 14E is done for a very specific reason. FIG. 15 shows the three emission point configurations from FIGS. 14A-14E, arranged to highlight that even with all of this shifting, twelve of the emission points 18 are actually common to all three configurations. That is, those twelve emission points 18 are 'on', or used, in each configuration and therefore do not require optical switches at all. Continuing this analysis, twelve emission points 18 are always used, four emission points 18 are used in two of the three configurations, and four emission points 18 are used in only one of the three configurations. Importantly, the emission points 18 used in two of three configurations can be properly combined, or multiplexed, with the emission points 18 used in one of three configurations using a pattern of only four optical switches. So, even with sixteen emission points 18 shifting around in three different configurations, only four optical switches 50 are actually required for the optical element 16, and only twenty total emission points 18 are needed. This represents a substantial simplification for this architecture, while also providing improved optical throughput and reliability for the majority of optical paths.

Figure 16:
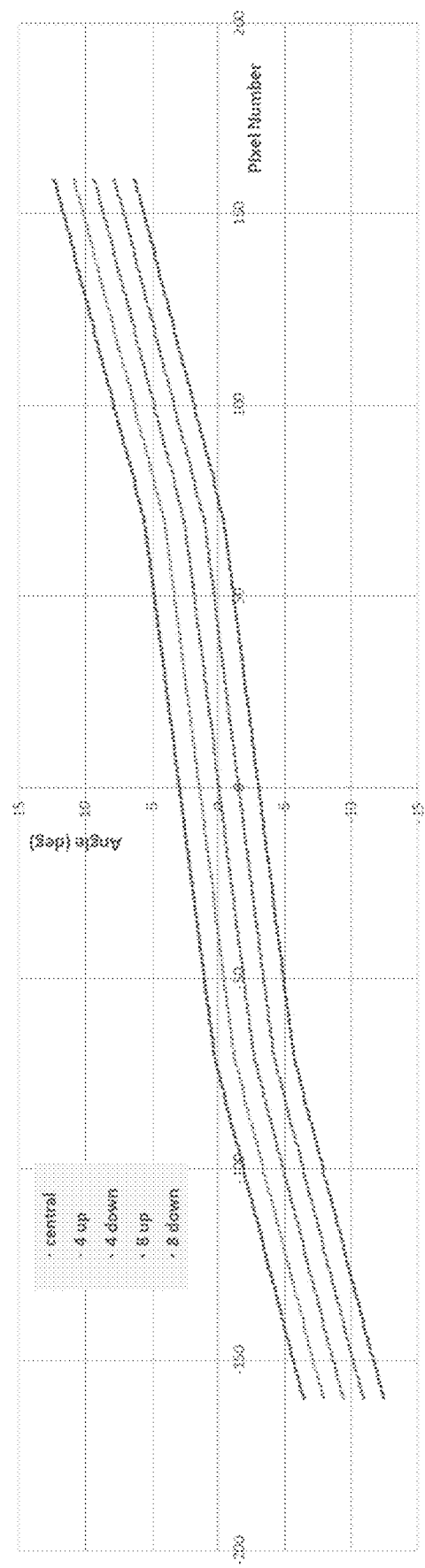
FIG. 16 depicts an exemplary change in angle caused by five different configurations.

FIG. 16 shows an extension of this scheme utilizing five reconfigurations rather than three. The first three configurations again use a central pattern as well as +/−4-point shifts, but now +/−8-point shifts are also included. The resulting angular scan patterns are shown, indicating a 19 deg instantaneous FOV with a 5.4 deg instantaneous central foveated region (with 0.04 deg resolution). With these five configurations, the FOV can be steered by +/−3 deg and the total (steerable) coverage for the central foveated region is 12 deg.

Figure 17:
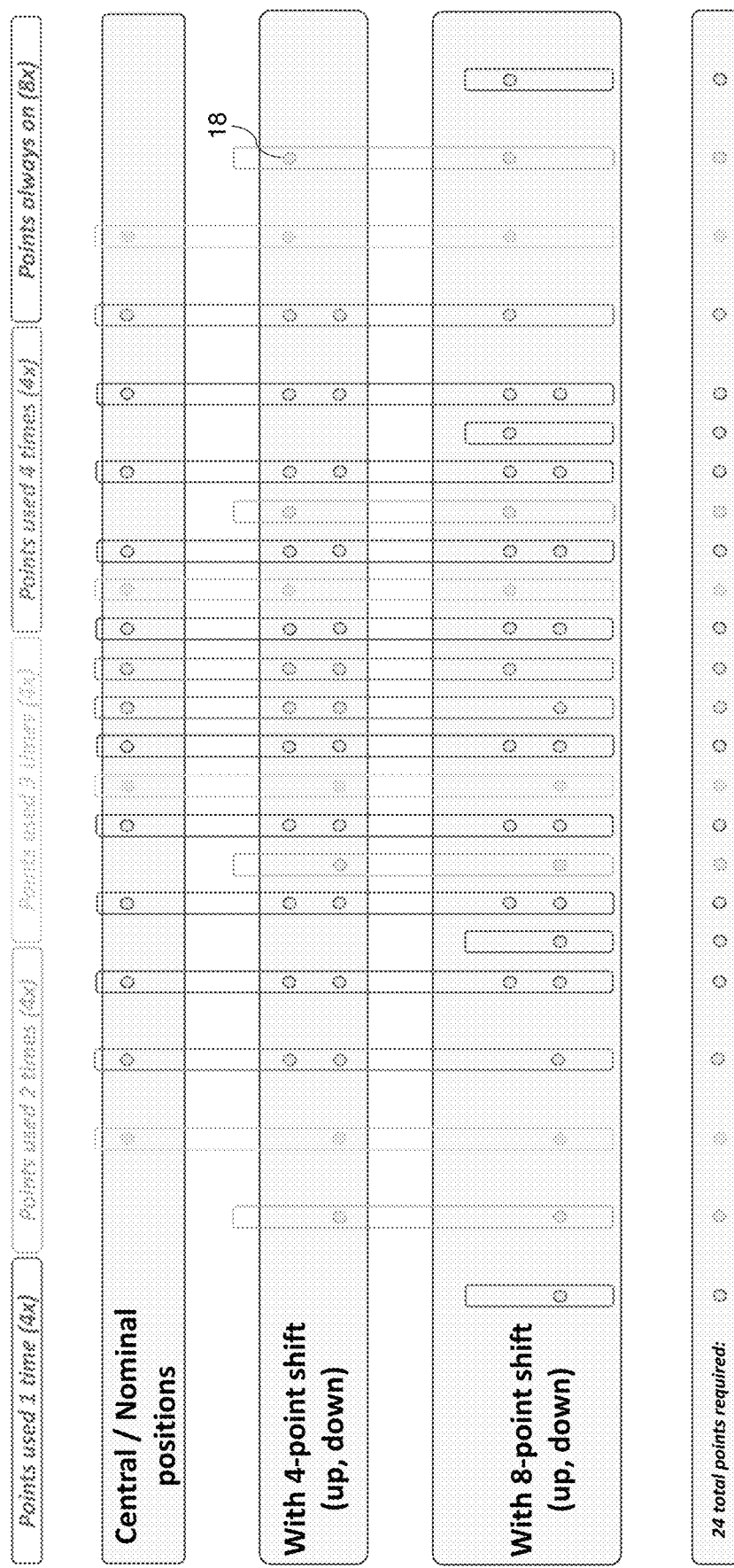
FIG. 17 depicts using multiple switches to alter which transmit paths are active to change between the five different configurations of FIG. 16.
Figure 18:
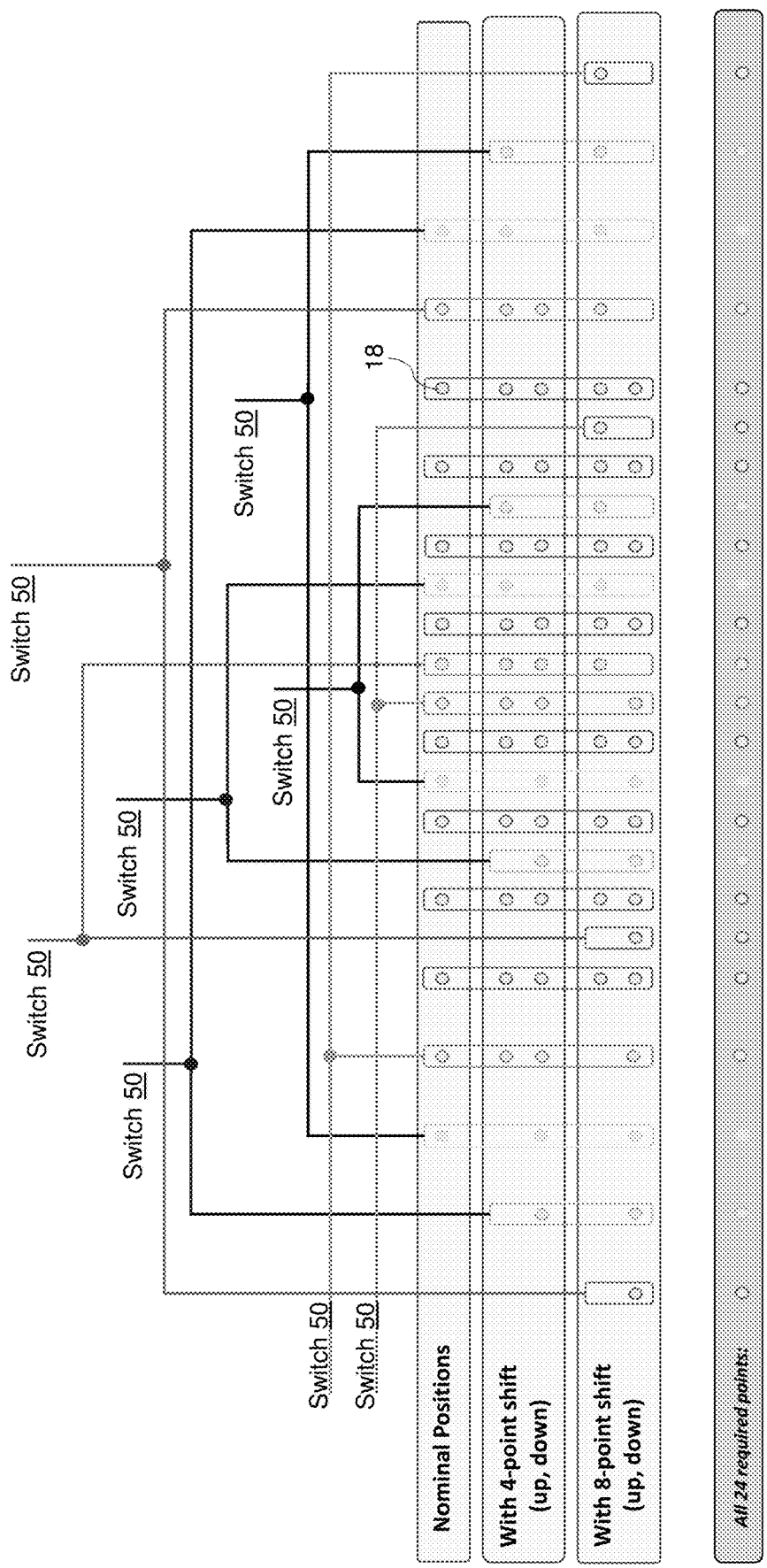
FIG. 18 depicts using eight switches to alter which transmit paths are active to change between multiple different configurations.

FIG. 17 extends the analysis of FIG. 15, showing that only twenty-four total emission point positions are in fact required to accommodate all five configurations, even with each configuration having sixteen simultaneous emission points 18. Now, if the positions are once again arranged to highlight the commonality, eight of the twenty-four emission point positions are used in every configuration, four of the twenty-four are used in four configurations, four of twenty-four are used in three configurations, four of twenty-four are used in two configurations, and four of twenty-four are used in only one configuration. With this information as guidance, FIG. 18 shows that the five configurations can be properly addressed using only eight optical switches (also referred to as optical switches), again proving the substantial simplification achievable with this point-sharing scheme.

Figure 19:
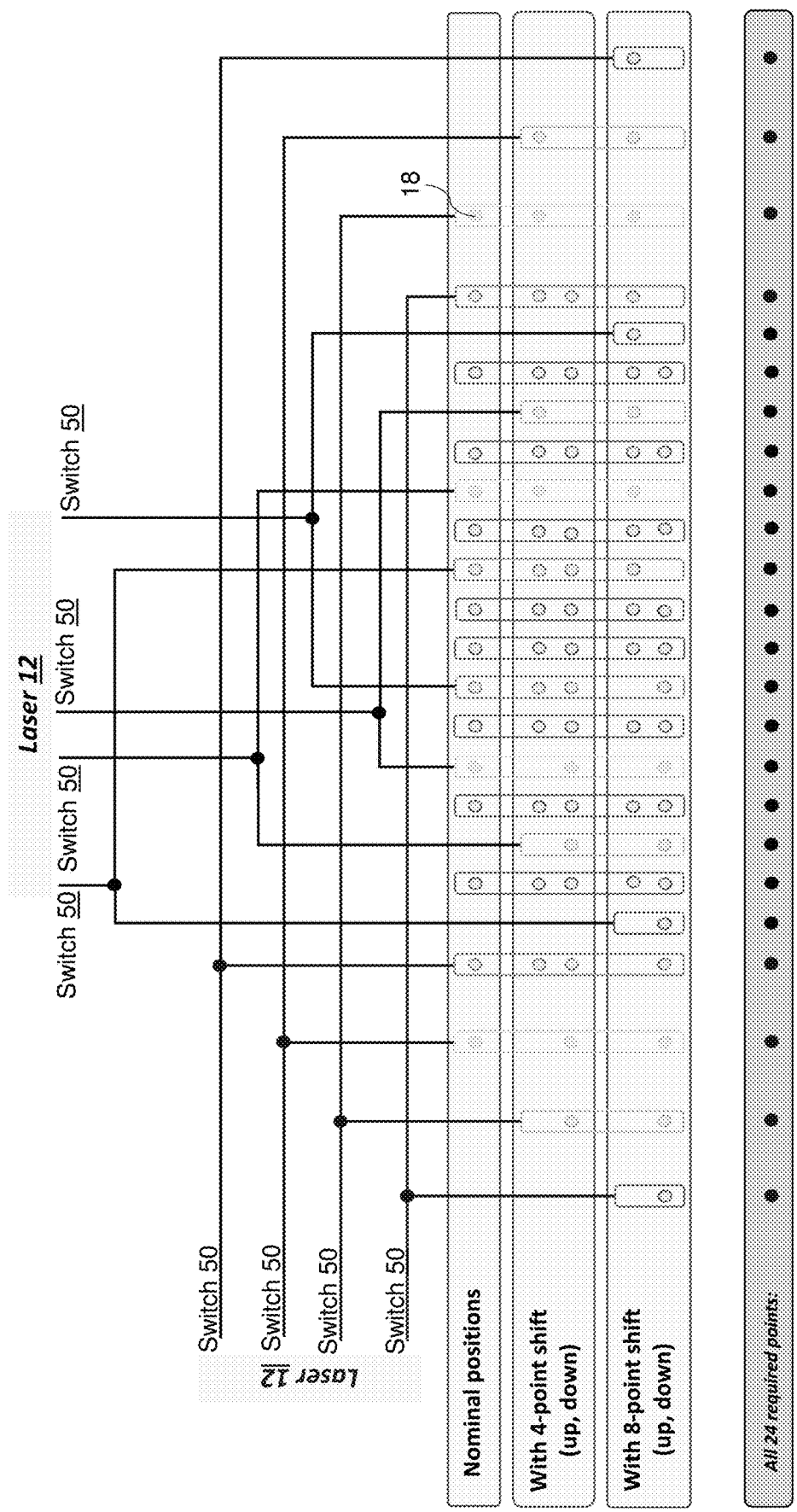
FIG. 19 depicts using multiple switches and multiple lasers to alter which transmit paths are active to change between the different configurations.

FIG. 19 shows another embodiment related to the 5-configuration scheme, where the switching design can be further refined to enable other desirable performance features. In this case, the modification is to enable two-laser operation, one for the innermost emission points 18 and another for the outermost emission points 18. This can be accomplished with the switch configuration in FIG. 19, where the 16 innermost emission points 18 are connected via four switches and can then be multiplexed into a first laser source, while the 8 outermost points are connected via four other switches (shown as connected to the left most laser 12 in the figure) and can be multiplexed into a second laser source. This specific configuration may also be viewed in terms of enabling redundancy with respect to the laser sources, providing means for higher reliability operation.

The designs and configurations described above relate generally to a high-speed 1-dimensional angular scanning architecture (as in FIG. 4), and provide means for achieving high resolution, foveation, and adaptive steering, with no moving parts. The time sequence for a simple but representative 1-D scan is shown in FIG. 20A, with i=4 uniform and simultaneous emission points 18 for the coarse scan and j=16 uniform wavelength steps within the fine scan. This demonstrates the single dimensionality of this high-speed angular scan. However, for most active imaging applications, 2-dimensional angular scanning is required.

In many 2-D angular scanning applications, the scanning means are operated in a 'step-and-stare' or 'step-then-settle' mode. This allows the scanning means to point in a direction, acquire data, then move to the next direction, settle and stabilize, acquire the next data, move to the next direction, etc. One advantage here, for active imaging schemes, is that the outgoing light and the returning light are exactly co-aligned spatially because everything is stationary for the actual data acquisition phase. For coherent active imaging systems, this is especially important as this exact spatial match between outgoing light and returning light minimizes well-known signal impairments and enables the use of optically non-reciprocal devices (such as optical circulators) to separate the outgoing and returning optical signals. This mode of operation is well-known to those skilled in the art. However, such a mode of operation is not conducive to high-speed imaging, as it is difficult for any angular scanning means operating in a 'step-then-settle' regime to meet the speed requirement.

Advantageously, for the optical configuration of FIG. 4, the first dimension of angular scanning can be achieved with very high speeds, provided that the tunable laser can change wavelengths rapidly and the system can properly accommodate multiple simultaneous emission points 18. This then provides for a first axis of angular scanning that can be appropriately labeled the 'fast axis' and, advantageously, may in fact still be operated in the 'step-and-stare' mode due to its extremely high speed. The second axis of scanning, necessary to complete a 2-D image, can then be much slower and only needs to operate at the imaging frame rate speed. This imaging rate is typically in the range of a few Hz to 100 Hz, meaning that this second axis of scanning can be appropriately labeled the 'slow axis'. Still, even at these slow scanning speeds, operating with a 'step-then-settle' mode proves to be a limitation. The best way to truly meet the requirements of high-speed imaging is to avoid 'step-then-settle' in favor of a mode of operation where the slow axis scanning means is constantly in motion. A further modification to the architecture of FIG. 4 enables this, while simultaneously eliminating the need for any optical non-reciprocal components.

FIG. 20B shows what the 'fast axis' angular scan pattern looks like when a second 'slow axis' scanning means operates simultaneously and in a direction orthogonal to it. Here again, a relatively simple configuration with i=4 uniform and simultaneous emission points 18 for the coarse scan and j=16 uniform wavelength steps within the fine scan is chosen. For each of the 4 simultaneous emission points 18, and for each instantaneous wavelength within the fine scan, the associated angular directions occur at the same time. But now since the second slow axis of scanning never stops moving, the second point in time (second wavelength, here) occurs at a slightly different position in space, translated in the direction of the slow axis scanning, and so on. The same sort of pattern emerges when coarse+fine scan interleaving is used to create foveation, as in FIG. 20C.

Figure 21A:
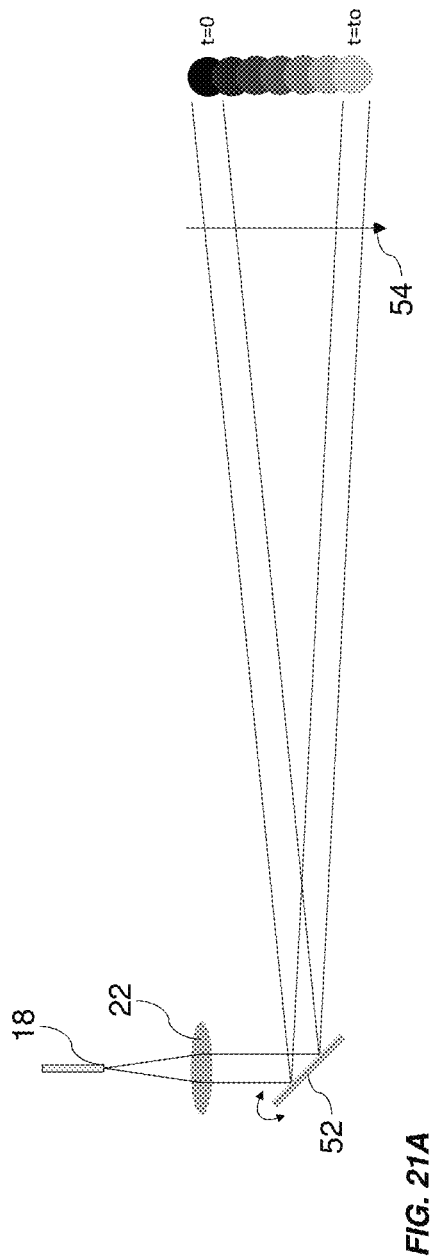
FIGS. 21A and 21B depict imaging conditions during scanning.

FIG. 21A shows a simplified view of scanning-related movement for a single point of emission, with angular scanning means 52 causing the final illuminated spot to move in time as shown along the arrow 54. If the illuminated spot at the object's distance is moving faster than the time it takes for the light to reach an object and return to the receiver optics, then the receiver optics are effectively 'pointed in the wrong direction' and scattered light from the object will not be optimally received. In this scenario, the receiver optics may now be pointed at the spot labeled t=to, while the scattered light from the object is actually emanating from the spot labeled t=0.

Figure 21B:
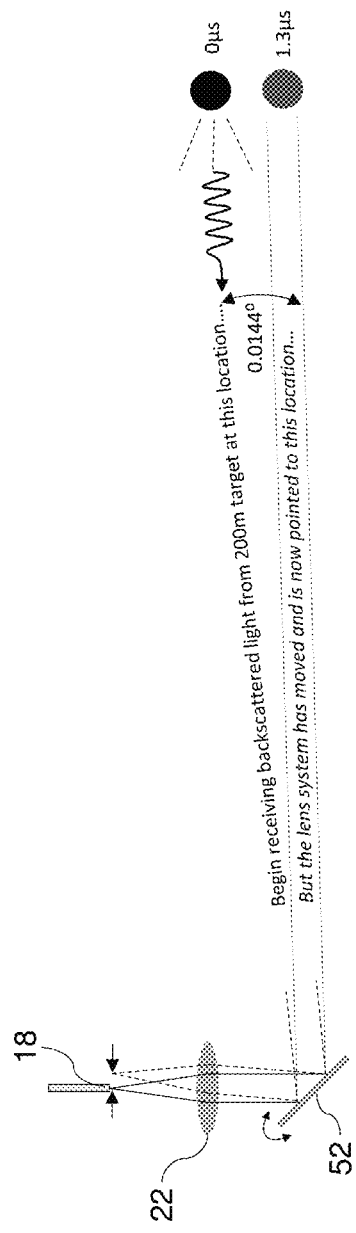

FIG. 21B adds quantitative detail to the scenario depicted in FIG. 21A for a distance of 200 m, a realistic fiber with 0.13 numerical aperture, a realistic lens of 80 mm focal length, and a realistic time frame of a few microseconds. Using these parameters produces an approximately collimated spot diameter of 2 cm at 200 m. If the scanning mirror has moved by 0.0144 degrees in 1.3 microseconds (=2*distance/speed of light), then the illuminated spot will have moved by about 5 cm at 200 m. So, in this scenario the transmit/receive optics will be pointed at the spot labeled 1.3 us, but due to the round-trip travel time of the light, the signal being received from the object will be originating from the direction labeled 0 us. This difference in direction for returning light is outside the instantaneous FoV for the transmitting optics, resulting in an image spatially offset from the original emission point, and therefore the return signal from the object will be greatly attenuated or unmeasurable if the goal is to measure it using the original emission point. However, positioning a detection aperture separate from the original transmitting aperture, with the correct spatial offset in the focal plane, can result in complete or nearly-complete recovery of that returning signal.

In this way, the spatial array of emission points 18 associated with the optical configuration of FIG. 4 may also incorporate a second, essentially identical spatial array of receive points, having a designed spatial offset in the direction of scan motion, to properly account for this effect arising from continuous scan motion. By physically separating these functions, optically non-reciprocal components such as optical circulators are no longer required, as the original outgoing transmission points and the ultimate incoming receiving points no longer require different optical signals on a common path to be separated, avoiding the optical losses, complexity, cost, and restrictions associated with circulators. This is an especially important embodiment for the field of Photonic Integrated Circuits (PICs), as for that technology there are still no practical and available implementations of circulators to date.

Figure 22:
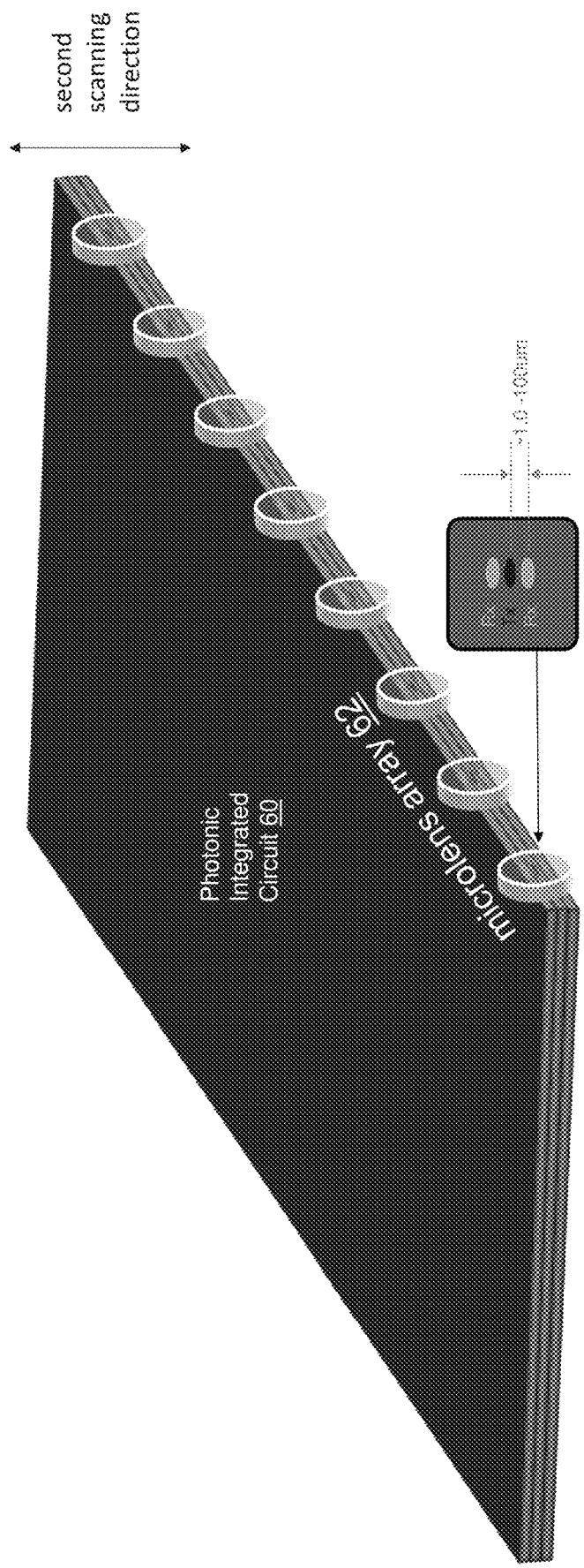
FIG. 22 depicts an optical system having physically separated transmit paths and receive paths.

A first example of such an architecture adaption to FIG. 4 is shown in FIG. 22, where the respective spatial arrays of emission points 18 and receive points are separated by a physical offset on the order of 1.0-100 micrometers, depending on the angular rate of scan motion. In this embodiment, the necessary physical offset is accomplished by using different waveguiding layers within a multi-layer PIC 60 for the emission points 18 and the receive points, and ultimately realized via operation from the edge of the PIC. Further, as the direction of scanning reverses, the required physical offset reverses, and this structure may accommodate that by having yet another layer with appropriate offset in the opposite direction from the emission point layer, as shown. Finally, this structure shows an optional microlens array 62 that may be used to improve the optical performance of such a PIC.

Figure 23B:
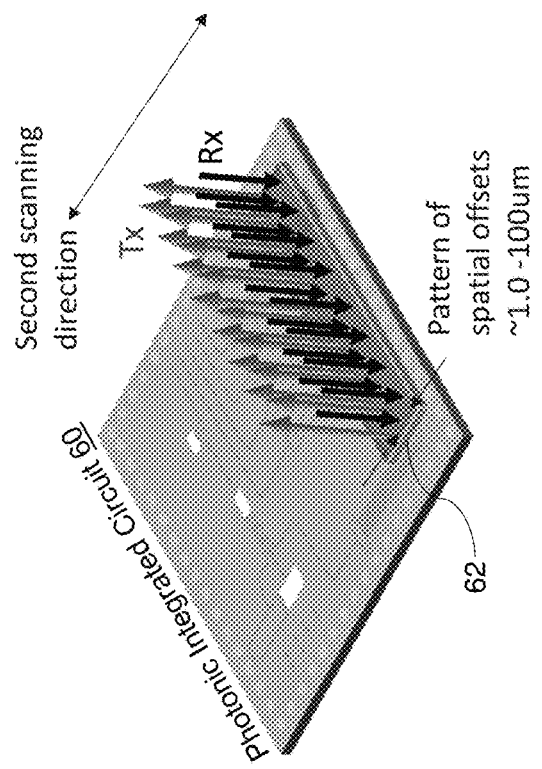
FIG. 23B depicts a photonic integrated circuit including an array of transmit and receive paths, each having two rows.
Figure 23A:
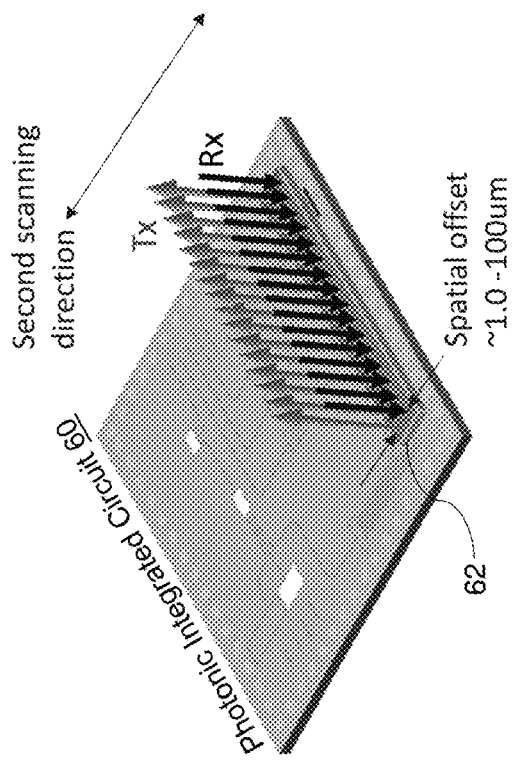
FIG. 23A depicts a photonic integrated circuit including an array of transmit and receive paths, each having a single row.

A second example is shown in FIG. 23A where the same principles apply in a general sense. However, here the requirement for multiple layers within the PIC may or may not be necessary. Also, the emission and receive functions are ultimately realized via the surface of the circuit rather than the edge. This is advantageous due to the ability to perform various functional tests of such a circuit at the wafer level, prior to the complex, expensive, and yield-reducing dicing/singulation/coating functions necessary to achieve similar performance via the edge of the circuit. Hence it is far more suitable for a high-volume application, and again may utilize an optional microlens array to improve optical performance. A final related embodiment is shown in FIG. 23B, indicating that the spatial arrays of emission and receive points do not necessarily have to occur in a line. The pattern of staggered offsets shown between the emission and receive points offers another means to distribute the final angular positions. Here the resulting angular pattern would be similar to FIG. 20, but with staggered offsets between the diagonal lines for every other emission point. This produces a pattern that more uniformly fills the 2-D space during a complete angular scan.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An optical system comprising:
    an electromagnetic radiation source configured to output electromagnetic radiation having a particular wavelength in time determined based on received input parameters, wherein the particular wavelength is within a wavelength range;
    a controller configured to control a wavelength of electromagnetic radiation emitted by the electromagnetic radiation source by supplying input parameters to the electromagnetic radiation source, such that the wavelength of the emitted electromagnetic radiation falls within the wavelength range;
    an optical element comprising a plurality of optical paths including:
        an array of transmit paths configured to transmit the electromagnetic radiation emitted by the electromagnetic radiation source, wherein:
            for a point in time, the electromagnetic radiation emitted by each of the transmit paths has a same wavelength;
            each of the transmit paths are separated from other transmit paths by a non-zero spatial offset; and
    a lens having an optical axis, wherein:
        the lens is positioned such that the optical element is located at a focal plane of the lens; and
        the lens is configured to alter a trajectory of the transmitted electromagnetic radiation by an angular offset based on a spatial offset between the transmit path and the optical axis of the lens; and a steering optical element configured to receive the transmitted electromagnetic radiation altered by the lens and modify a trajectory of the altered transmitted electromagnetic radiation by an angle dependent upon a wavelength of the altered transmitted electromagnetic radiation without mechanically moving the steering optical element.

2. The optical system of claim 1, wherein:
the transmit paths include at least one pair of adjacent transmit paths including a first transmit path and an other transmit path;
the at least one pair of adjacent transmit paths are positioned such that:
trajectories of the electromagnetic radiation emitted by the transmit paths over the wavelength range define an angular range;
at least one wavelength of electromagnetic radiation within the wavelength range and emitted by the first transmit path overlaps with the angular range of the other transmit path.

3. The optical system of claim 1, wherein a pattern formed by the trajectories of the transmit paths is foveated with:
a central portion having a higher density of trajectories in angular space; and
an outer portion adjacent to the central portion having a lower density of trajectories in angular space than the central portion.

4. The optical system of claim 1, wherein the steering optical element comprises an optically dispersive element.

5. The optical system of claim 1, wherein the array of transmit paths are configured to simultaneously receive electromagnetic radiation from the electromagnetic radiation source, such that the electromagnetic radiation is transmitted simultaneously from the plurality of transmit paths.

6. The optical system of claim 1, wherein:
each of the transmit path trajectories is projected onto a detection point in angular space by the lens and the steering optical element; and
spatial positions for the plurality of transmit paths are non-uniformly spaced, such that the detection points associated with the plurality of transmit path trajectories are non-uniformly spaced.

7. The optical system of claim 6, wherein:
the detection points are non-uniformly spaced such that the detection points are more highly concentrated in particular regions of angular space; and
the higher concentration of the detection points in the particular regions of angular space results in a higher resolution data for imaging of the particular areas.

8. The optical system of claim 1, wherein the optical system does not include an optically non-reciprocal device.

9. The optical system of claim 1, wherein the optical element comprises a photonic integrated circuit.

10. The optical system of claim 1, wherein the lens comprises multiple lens elements.

11. The optical system of claim 1, wherein the electromagnetic radiation source comprises a laser and the electromagnetic radiation output by the laser is directed to the array of transmit paths.

12. The optical system of claim 1, wherein the electromagnetic radiation source comprises multiple lasers and the electromagnetic radiation output by the multiple lasers is directed to the plurality of transmit paths.

13. The optical system of claim 12, wherein the multiple lasers have a different central wavelength, such that the wavelength range for the electromagnetic radiation emitted by each of the multiple lasers is different.

14. The optical system of claim 1, wherein:
the array of transmit paths includes inactive transmit paths and active transmit paths;
both the inactive transmit paths and the active transmit paths include at least one of the transmit paths;
at a point in time, the active transmit paths emit electromagnetic radiation and the inactive transmit paths do not emit electromagnetic radiation.

15. The optical system of claim 14, further comprising:
an optical switching system configured to receive a signal from the controller to modulate which transmit paths are active transmit paths and which transmit paths are inactive transmit paths, wherein the controller is further configured to transmit the signal to the optical switching system.

16. The optical system of claim 15, further comprising:
an image sensor configured to capture images, wherein the controller is configured to:
receive images from the image sensor;
identify a position of a horizon in the received images;
modulate the active transmit paths and the inactive transmit paths, via the optical switching system, based on the position of the horizon.

17. The optical system of claim 16, wherein the controller is configured to modulate the active transmit paths and the inactive transmit paths such that a central location of the trajectories of the active transmit paths overlaps with the horizon.

18. The optical system of claim 17, wherein the central location includes the trajectory of a transmit path at a spatially central location of the active transmit paths.

19. The optical system of claim 15, wherein the optical switching system comprises a plurality of optical switches.

20. The optical system of claim 14, wherein:
the active transmit paths have a spatial pattern comprising distances between individual active transmit paths and relative positions of the active transmit paths;
the spatial pattern has a central point; and
maintaining the spatial pattern while altering the central point of the spatial pattern, shifts a central location of the angular trajectories of the active transmit paths.

21. The optical system of claim 20, wherein the controller is configured to change between multiple different configurations having a similar spatial pattern and a different central point by controlling the optical switching system.

22. The optical system of claim 21, wherein:
the multiple different configurations comprise three different configurations;
the spatial pattern has sixteen active transmit paths; and
the optical switching system comprises four optical switches.

23. The optical system of claim 21, wherein:
the multiple different configurations comprise five different configurations;
the array of transmit paths includes twenty-four transmit paths;
the spatial patterns have sixteen active transmit paths; and
the optical switching system comprises eight optical switches.

24. The optical system of claim 23, wherein:
the electromagnetic radiation source comprises two laser sources;
the first laser source of the two laser sources supplies electromagnetic radiation to a subset of the emission points; and the second laser source of the two laser sources supplies electromagnetic radiation to a complementary subset of the emission points.

25. The optical system of claim 1, wherein:
the optical element further includes an array of receive paths;
each of the receive paths is associated with one of the transmit paths, such that the electromagnetic radiation transmitted by a particular transmit path of the transmit paths that returns to the optical system is received by the associated receive path; and
each of the receive paths is located separately from the associated transmit path, such that there is a non-zero spatial offset between each of the receive paths and the associated transmit path.

26. The optical system of claim 25, further comprising a scanner configured to alter trajectories of the electromagnetic radiation transmitted by the steering optical element, wherein:
the scanner is controlled by the controller such that the trajectories of the electromagnetic radiation transmitted by the steering optical element are moved through an angular range such that multiple subparts are captured to form an array of information.

27. The optical system of claim 25, wherein the non-zero spatial offset is determined based on a movement direction and angular rate of the scanner.

28. The optical system of claim 25, further comprising:
a photosensor configured to detect the returning electromagnetic radiation received by the receive paths; and
the controller is further configured to process the received signals based on the detected returning electromagnetic radiation.

29. The optical system of claim 25, wherein:
the array of transmit paths has a nonuniform spacing between the transmit paths
the array of receive paths has a nonuniform spacing between the receive paths;
emission points of the transmit paths are positioned to transmit electromagnetic radiation to the lens, such that the transmitted electromagnetic radiation received by the lens results in a coarse angular pattern comprising nonuniform angular trajectories of electromagnetic radiation projected after the lens;
the steering optical element is positioned to receive the coarse angular pattern;
the controller is configured to alter the wavelength of the emitted electromagnetic radiation, such that the steering optical element alters the nonuniform angular trajectories of the coarse angular scan by a fine angular separation; and
the fine angular separation is at least twice as small as the coarse angular separation.

30. The optical system of claim 29, wherein the controller is configured to alter the wavelength of the emitted electromagnetic radiation in a pattern of linearly or non-linearly spaced steps to alter the nonuniform angular trajectories of the coarse angular scan by a fine angular separation, creating a set or pattern of altered nonlinear angular fine trajectories.

31. The optical system of claim 30, wherein:
at least one set of altered nonlinear angular fine trajectories for one or more of the transmit paths in the coarse angular pattern overlaps the set of altered nonlinear angular fine trajectories from another transmit path in the coarse angular pattern; and a combined angular scan pattern formed by the set of all altered nonlinear angular fine trajectories from all transmit paths varies spatially by a nonlinear pattern.

32. The optical system of claim 29, wherein;
the controller is configured to alter the central wavelength of the range of wavelengths for the emitted electromagnetic radiation by an amount at least five times larger than the amount required for the fine angular separation; and
the resulting combined angular scan pattern formed by all the transmit paths shifts in angle by an amount much larger than the fine angular separation.

33. The optical system of claim 29, wherein:
each of the plurality of transmit paths is projected onto a detection point in angular space;
the controller is configured to alter the wavelength of the emitted electromagnetic radiation across a range of wavelengths, such that the returning electromagnetic radiation from the detection points form pixels of a subpart of an image; and
the subpart comprises a row or a column of an image.

34. The optical system of claim 33, further comprising a scanner configured to alter trajectories of the electromagnetic radiation transmitted by the steering optical element, wherein:
the scanner is controlled by the controller such that the trajectories of the electromagnetic radiation transmitted by the steering optical element are altered such that multiple subparts are captured to form an image.

35. The optical system of claim 34, wherein the scanner comprises a moving optical element.

36. A method for controlling an optical system including an electromagnetic radiation source, a controller, an optical element, a lens, and a steering element, the method comprising:
using the controller to provide input parameters to the electromagnetic radiation source, such that a wavelength of electromagnetic radiation emitted by the electromagnetic radiation source falls within a wavelength range, wherein:
the electromagnetic radiation emitted by the electromagnetic radiation source has a particular wavelength in time determined based on the provided input parameters;
an optical element comprising a plurality of optical paths including:
transmit the electromagnetic radiation emitted by the electromagnetic radiation source via an array of transmit paths of the optical element, wherein:
for a point in time, the electromagnetic radiation emitted by each of the transmit paths has a same wavelength;
each of the transmit paths are separated from other transmit paths by a non-zero spatial offset;
alter a trajectory of the transmitted electromagnetic radiation by an angular offset using the lens based on a spatial offset between the transmit path and an optical axis of the lens, wherein:
the lens is positioned such that the optical element is located at a focal plane of the lens; and
using the steering optical element, modify a trajectory of the transmitted electromagnetic radiation altered by the lens by an angle dependent upon a wavelength of the altered transmitted electromagnetic radiation without mechanically moving the steering optical element.

37. The method of claim 36, wherein a pattern formed by the trajectories of the transmit paths is foveated with:

a central portion having a higher density of trajectories in angular space; and
an outer portion adjacent to the central portion having a lower density of trajectories in angular space than the central portion.

38. The method of claim 36, wherein the array of transmit paths are configured to simultaneously receive electromagnetic radiation from the electromagnetic radiation source, such that the electromagnetic radiation is transmitted simultaneously from the plurality of transmit paths.

39. The method of claim 36, wherein:
each of the transmit path trajectories is projected onto a detection point in angular space by the lens and the steering optical element; and
spatial position for the plurality of transmit paths are non-uniformly spaced, such that the detection points associated with the plurality of transmit path trajectories are non-uniformly spaced.

40. The method of claim 36, wherein:
the detection points are non-uniformly spaced such that the detection points are more highly concentrated in particular regions of angular space; and
the higher concentration of the detection points in the particular regions of angular space results in a higher resolution data for imaging of the particular areas.

41. The method of claim 36, wherein:
the array of transmit paths includes inactive transmit paths and active transmit paths;
both the inactive transmit paths and the active transmit paths include at least one of the transmit paths;
at a point in time, the active transmit paths emit electromagnetic radiation and the inactive transmit paths do not emit electromagnetic radiation.

42. The method of claim 41:
wherein the optical system further includes an optical switching system;
further comprising using the controller to transmit a signal to the optical switching system to modulate which transmit paths are active transmit paths and which transmit paths are inactive transmit paths.

43. The method of claim 36:
wherein the optical system further includes an image sensor configured to capture images;
further comprising:
receiving images by the controller from the image sensor;
using the controller to identify a position of a horizon in the received images;
using the controller to modulate the active transmit paths and the inactive transmit paths, via the optical switching system, based on the position of the horizon.

44. The method of claim 42, further comprising using the controller to modulate the active transmit paths and the inactive transmit paths such that a central location of the trajectories of the active transmit paths overlaps with the horizon.

45. The method of claim 41, wherein:
the active transmit paths have a spatial pattern comprising distances between individual active transmit paths and relative positions of the active transmit paths;
the spatial pattern has a central point; and
maintaining the spatial pattern while altering the central point of the spatial pattern, shifts a central location of the angular trajectories of the active transmit paths.

46. The optical system of claim 44, further comprising using the controller to change between multiple different configurations having a similar spatial pattern and a different central point by controlling the optical switching system.

47. The method of claim 36, wherein:
the optical element further includes an array of receive paths;
each of the receive paths is associated with one of the transmit paths, such that the electromagnetic radiation transmitted by a particular transmit path of the transmit paths that returns to the optical system is received by the associated receive path; and
each of the receive paths is located separately from the associated transmit path, such that there is a non-zero spatial offset between each of the receive paths and the associated transmit path.

48. The method of claim 46:
wherein the optical system additionally includes a scanner;
further comprising using the controller to control the scanner to alter trajectories of the electromagnetic radiation transmitted by the steering optical element, such that the trajectories of the electromagnetic radiation transmitted by the steering optical element are moved through an angular range such that multiple subparts are captured to form an array of information.

49. The method of claim 46:
wherein:
the array of transmit paths has a nonuniform spacing between the transmit paths
the array of receive paths has a nonuniform spacing between the receive paths;
emission points of the transmit paths are positioned to transmit electromagnetic radiation to the lens, such that the transmitted electromagnetic radiation received by the lens results in a coarse angular pattern comprising nonuniform angular trajectories of electromagnetic radiation projected after the lens;
the steering optical element is positioned to receive the coarse angular pattern;
further comprising using the controller to alter the wavelength of the emitted electromagnetic radiation, such that the steering optical element alters the nonuniform angular trajectories of the coarse angular scan by a fine angular separation, wherein the fine angular separation is at least twice as small as the coarse angular separation.

50. The method of claim 49, further comprising creating a set or pattern of altered nonlinear angular fine trajectories by using the controller to alter the wavelength of the emitted electromagnetic radiation in a pattern of linearly or non-linearly spaced steps to alter the nonuniform angular trajectories of the coarse angular scan by a fine angular separation.

51. The method of claim 50, wherein;
at least one set of altered nonlinear angular fine trajectories for one or more of the transmit paths in the coarse angular pattern overlaps the set of altered nonlinear angular fine trajectories from another transmit path in the coarse angular pattern; and
a combined angular scan pattern formed by the set of all altered nonlinear angular fine trajectories from all transmit paths varies spatially by a nonlinear pattern.

* * * * *